(12) United States Patent
Pyle et al.

(10) Patent No.: US 8,930,299 B2
(45) Date of Patent: Jan. 6, 2015

(54) SYSTEMS AND METHODS FOR WIND FORECASTING AND GRID MANAGEMENT

(75) Inventors: Richard Pyle, Longmont, CO (US);
Nicholas Wilson, Louisville, CO (US);
Jianmin Shao, Birmingham (GB)

(73) Assignee: Vaisala, Inc., Louisville, CO (US)

( * ) Notice: Subject to any disclaimer, the term of this patent is extended or adjusted under 35 U.S.C. 154(b) by 358 days.

(21) Appl. No.: 13/327,527

(22) Filed: Dec. 15, 2011

(65) Prior Publication Data

US 2012/0185414 A1    Jul. 19, 2012

Related U.S. Application Data

(60) Provisional application No. 61/423,507, filed on Dec. 15, 2010.

(51) Int. Cl.
G01W 1/10 (2006.01)

(52) U.S. Cl.
CPC ........... *G01W 1/10* (2013.01); *F05B 2260/8211* (2013.01)
USPC ........................................................ 706/52

(58) Field of Classification Search
CPC ...... G01W 1/10; G06F 17/30516; G06N 7/06
USPC ................... 706/11; 702/3; 342/26 R
See application file for complete search history.

(56) References Cited

U.S. PATENT DOCUMENTS 5,517,193 A * 5/1996 Allison et al. .............. 342/26 R
2006/0173623 A1 * 8/2006 Grzych et al. .................... 702/3

FOREIGN PATENT DOCUMENTS

EP    2148225 A1    1/2010

OTHER PUBLICATIONS

C. Ferreira, J. Garna, L. Matias, A. Botterud, and J. Wang, "A Survey on Wind Power Ramp Forecasting", Argonne National Laboratory, Dec. 2010, 40 pages.*
AWS Truewind, LLC; "AWS Truewind's Final Report for the Alberta Forecasting Pilot Project," *Alberta Electric System Operator*, 2008; 66 pages.
Botterud et al.; "Advanced Wind Forecasting for Improved Power System Operations," *Windpower Conference and Exhibition*, Chicago, Illinois, 2009; 16 pages.
Collier, Craig; "Temporal Forecast Uncertainty for Ramp Events," *Windpower Conference and Exhibition*, Chicago, Illinois, 2009; 14 pages.
Enernex Corporation et al.; "Wind Integration Study—Final Report," Xcel Energy and the Minnesota Department of Commerce, 2004; 145 pages.
Hering et al.; "Powering Up with Space-Time Wind Forecasting," *King Abdullah University of Science and Technology*, 2009; 33 pages.

(Continued)

*Primary Examiner* — Jeffrey A Gaffin
*Assistant Examiner* — Ola Olude Afolabi
(74) *Attorney, Agent, or Firm* — Maschoff Brennan

(57) ABSTRACT

In one embodiment, a wind power ramp event nowcasting system includes a wind condition analyzer for detecting a wind power ramp signal; a sensor array, situated in an area relative to a wind farm, the sensor array providing data to the wind condition analyzer; a mesoscale numerical model; a neural network pattern recognizer; and a statistical forecast model, wherein the statistical model receives input from the wind condition analyzer, the mesoscale numerical model, and the neural network pattern recognizer; and the statistical forecast model outputs a time and duration for the wind power ramp event (WPRE) for the wind farm.

19 Claims, 18 Drawing Sheets

(56) References Cited

OTHER PUBLICATIONS

Miranda et al.; "New Concepts in Wind Power Forecasting Models," *Windpower Conference and Exhibition*, Chicago, Illinois, 2009; 9 pages.

Zack, John W.; "Overview of the Current Status and Future Prospects of Wind Power Production Forecasting for the ERCOT System," *ERCOT Workshop*, 2009; 46 pages.

Larson et al., "Statistical Algorithms for Short-Term Wind Energy Forecasting", Jan. 12, 2004, 2 pgs.

Larson, Kristen, "Short-term Wind Forecasting using Off-site Observations and Numerical Weather Prediction," 3TIER Environmental Forecast Group, Dec. 7, 2005, 25 pgs.

Zack, John W., "Facilitating Higher Levels of Wind Power Penetration: Forecasting Significant Ramp Events," AWS TrueWind, LLC, 2009, 10 pgs.

* cited by examiner

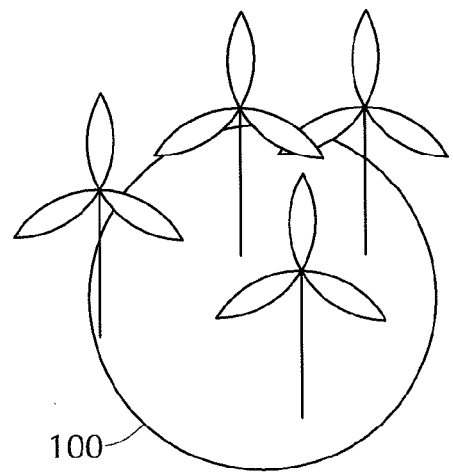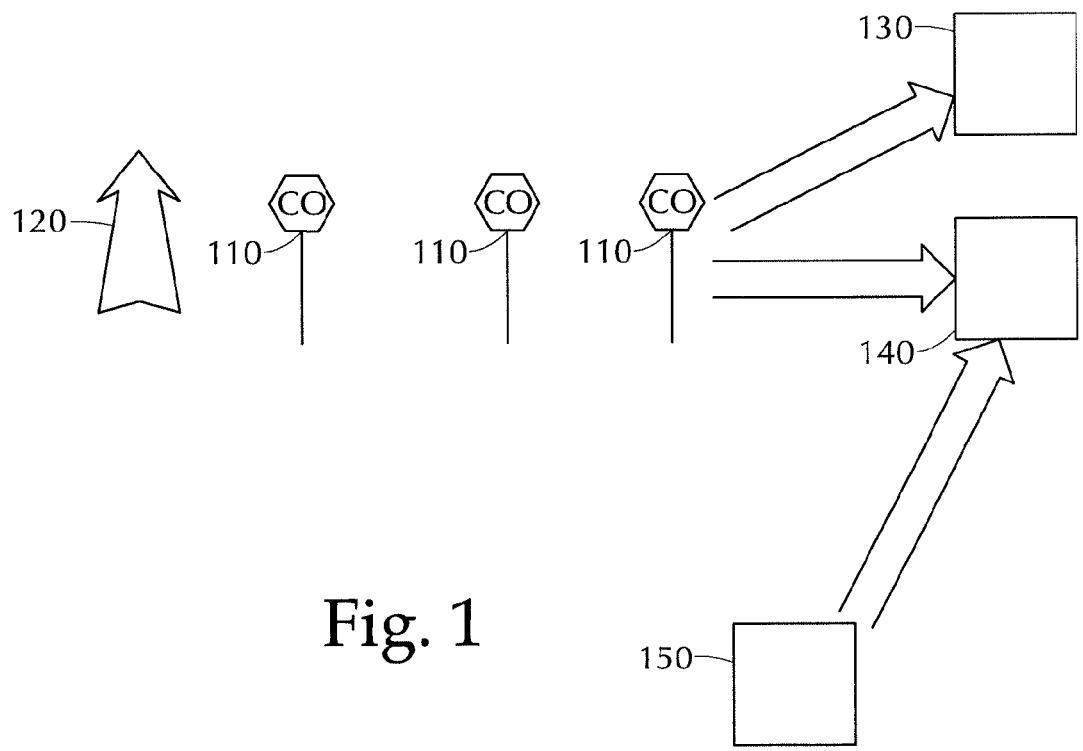
Fig. 1

Fig. 12

Next ramp:     Logan-Peetz     +5min     Level 2 Down     -221MW 1210             1220       1230       1240       1250       1260       1270

Ramp event summary

| Ramp event to | Wind from | Time until start | Type | Magnitude | Start time | End time | Duration |
|---|---|---|---|---|---|---|---|
| 579 | Logan-Peetz | | Level 1 Up | +100MW | 2009/9/2 11:33:02 | 2009/9/2 11:38:22 | 5 |
| 581 | Logan-Peetz | +5 minutes | Level 1 Up | +180MW | 2009/9/2 12:33:02 | 2009/9/2 12:38:02 | 5 |
| 584 | Logan-Peetz | | Level 2 Down | +221MW | 2009/9/2 17:33:02 | 2009/9/2 17:58:02 | 55 |
| 585 | Logan-Peetz | +100 minutes | Level 4 Up | +282MW | 2009/9/2 18:33:02 | 2009/9/2 18:3:02 | 25 |

Fig. 13

Settings | System | Ramp event classification

Magnitude     1310        1320

Level 1:    25    to    100    MW
Level 2:    100    to    200    MW
Level 3:    200    to    300    MW
Level 4:            over    300    MW Rate of change     1330        1340

Level 1:    0    to    10    MW/min
Level 2:    5    to    10    MW/min
Level 3:    8    to    10    MW/min
Level 4:                 10    MW/min

[OK]    [Reset]    [Cancel]

SYSTEMS AND METHODS FOR WIND FORECASTING AND GRID MANAGEMENT

CROSS-REFERENCE TO RELATED APPLICATION

This application claims the benefit under 35 USC 119(e) of U.S. Provisional Patent Application No. 61/423,507 filed Dec. 15, 2010, which provisional application is hereby incorporated by reference to the same extent as though fully disclosed herein.

BACKGROUND OF THE INVENTION

Wind energy, generated by winds, is fast becoming an important renewable energy resource, as well as a stable, profitable, and low-risk investment worldwide. Based on available figures from 11 of the top 15 countries representing over 80% of the world market, World Wind Energy Association (WWEA) recorded 5374 megawatts (MW) of new installed capacity in the first quarter of 2009, equaling an increase of 23% compared with last year in the same countries. WWEA keeps its previous prevision of a total installed capacity of 152,000 MW worldwide by the end of 2009, which will mean a new record of over 30,000 MW of newly installed capacity within one year. This represents a market growth of 25% compared with last year.

By comparison with other renewable energy sources, wind energy is associated with one of the lowest costs of electricity production and the largest resource availability. Because of its technical maturity and efficiency, wind energy has been widely regarded as one of the most prominent energy resources in the future. The intermittent and volatile nature of winds poses several problems to wind power generation. One of the largest problems, as compared to conventionally generated electricity, is that wind power is dependent on volatile wind. Wind volatility occurs on all time scales, from milliseconds to days, and wind volatility impacts both individual turbine control and the integration of wind power into an electrical grid network. Wind volatility poses various challenges to the wind energy industry.

Many of the challenges posed by wind volatility are connected to the requirements for forecasting wind energy production with a certain degree of accuracy. Increases in the accuracy of wind energy forecasts reduce the requirement for backup energy, resulting in increased power grid reliability, as well as significant monetary savings. Accurate prediction of wind power is crucial, both for technical and financial reasons. For example, wind farm operators need the prediction of wind power to be accurate to avoid being penalized by the system operator for not generating power as predicted.

The development of forecasting technologies is needed to address these challenges. An immediate requirement is for the development of improved short-term forecasting methods, which are necessary for transmission scheduling and resource allocation. The short-term forecasting methods need to address areas of interest with a greater degree of accuracy and resolution. Of central concern are short term wind energy forecasts in the range of 0-3 hours, for example. This lead time is typical of the time necessary for transmission scheduling and the dispatching of resources to keep the power supply in the grid in line with power demands.

SUMMARY

In one embodiment, a wind power ramp event nowcasting system includes a wind condition analyzer for detecting a wind power ramp signal; a sensor array, situated in an area relative to a wind farm, the sensor array providing data to the wind condition analyzer; a physical numerical model; a neural network pattern recognizer; and a statistical forecast model, wherein the statistical model receives input from the wind condition analyzer, the physical numerical model, and the neural network pattern recognizer; and the statistical forecast model outputs a time and duration for the Wind Power Ramp Event (WPRE) for the wind farm. Optionally, the wind condition analyzer includes a surface observation analyzer and a vertical atmospheric analyzer. In one alternative, the surface observation analyzer detects a significant change in wind speed. Alternatively, the surface observation analyzer detects strong vertical and horizontal wind shears. In another alternative, the surface observation analyzer detects a pressure drop or surge at the surface. Alternatively, the surface observation analyzer detects a temperature increase or decrease. In one alternative, the physical numerical model is a mesoscale numerical model. In yet another alternative, the surface observation analyzer detects shifts in atmospheric stability. Alternatively, the data is provided from an Atmospheric Observation Network (AON) which is part of the sensor array. In yet another alternative, the surface observation analyzer includes a module for detecting and calculating winds, pressure, temperature, and humidity. In yet another alternative, the vertical atmospheric analyzer provides vertical profiles of horizontal wind speed and direction. Optionally, the vertical atmospheric analyzer provides boundary and mixing layer heights and atmospheric instability. Optionally, the neural network pattern recognizer is trained by providing it teaching patterns. In another alternative, the neural network pattern recognizer changes according to a learning rule. Optionally, the teaching patterns are up-wind meteorological variables. Optionally, the up-wind meteorological variables are wind speed, wind direction, pressure, temperature, and humidity. In another alternative, the teaching patterns are data sets which involve WPREs. In another alternative, the system further includes a radar analyzer, which provides input to the statistical forecast model. In another alternative, a Lagrangian Scalar Integration analyzer provides input to the statistical forecast model.

In one embodiment, a wind forecasting system includes a wind condition analyzer for detecting a wind event signal; a sensor array, situated in an area, the sensor array providing data to the wind condition analyzer; a mesoscale numerical model; a neural network pattern recognizer; and a statistical forecast model, wherein the statistical forecast model receives input from the wind condition analyzer, the mesoscale numerical model, and the neural network pattern recognizer, and the statistical forecast model outputs a wind event for the area. Alternatively, the neural network pattern recognizer is trained by providing it teaching patterns. Alternatively, the neural network pattern recognizer changes according to a learning rule. In another alternative, the teaching patterns are up-wind meteorological variables. Optionally, the up-wind meteorological variables are wind speed, wind direction, pressure, temperature, and humidity. In another alternative, the teaching patterns are data sets which involve prior occurrences of wind events similar to the wind event. Alternatively, the prior occurrences of wind events are events that cause a WPRE. In another alternative, prior occurrences of wind events are tornadoes. Alternatively, prior occurrences of wind events are thunderstorms. Optionally, prior occurrences of wind events are storms with damaging winds.

In one embodiment, a graphical user interface system for managing a wind farm includes a WPRE event prediction window, showing predicted wind and WPRE events; and an Atmospheric Observation Network (AON) monitoring window, showing the AON network and the wind farm. In one alternative, the system includes a ramp event message window showing ramp event alerts. In one alternative, the system includes a ramp event classification screen, providing for classification of ramp events. In one alternative, the system includes a history window, providing a history of past events and wind generation statistics.

In one embodiment, a method of providing a comprehensive wind forecast includes providing a first segment of the forecast, from time t0 to t1, based on a nowcast, the nowcast created by a statistical model receiving input from a wind condition analyzer, a mesoscale numerical model, and a neural network pattern recognizer; providing a second segment of the forecast, from time t1 to t2, based on a physical model; and providing a third segment based on National Weather Service forecasting.

In one embodiment, a method of providing a wind event forecast includes detecting a footprint of a wind event for an area of interest with a first module; determining a duration and intensity of the wind event with a second module; and providing the wind event forecast. In one alternative, the method further includes providing sensor data from a sensor array to the first module that is upwind of the area of interest, wherein the sensor data is used to detect the footprint. In another embodiment the method further includes providing the sensor data from the sensor array to the second module, wherein the sensor data is used in the determining. Alternatively, the first module includes a surface observation analyzer. Optionally, the first module includes a vertical atmospheric analyzer. Optionally, the first module detects fronts as part of detecting the footprint. In one option, the fronts are marked by changes in temperature, moisture, wind speed and direction, atmospheric pressure, and a change in the precipitation pattern. Optionally, the first module detects mesoscale features as part of detecting the footprint. In one alternative, the mesoscale features are marked by an increase in cumuliform clouds and rain showers. In another alternative, the first module detects dry lines as part of detecting the footprint. Alternatively, the first module detects outflow boundaries/squall lines as part of detecting the footprint. In another alternative, the first module detects lee troughs as part of detecting the footprint. Alternatively, the first module detects sea/lake breezes as part of detecting the footprint. In another alternative, second module includes a neural network. Optionally, second module includes a mesoscale numerical model. In another alternative, second module includes a physical numerical model. In yet another alternative, the second module includes a neural network and mesoscale numerical model. In one alternative, the method further includes training the neural network by providing weather data. In another alternative, the weather data is data sets which involve WPREs only. Optionally, a statistical forecast model performs the providing. Optionally, the statistical forecast model uses AR regression. In one alternative, the footprint is fine spatial and temporal features of conditions that correlate to the wind event. In one alternative, the method further includes, providing weather data from public weather sources to the first module, wherein the public weather data is used in the predicting. In another alternative, the method further includes providing weather data from public weather sources to the second module, wherein the public weather data is used in the determining.

BRIEF DESCRIPTION OF THE DRAWINGS

FIG. 1 shows an embodiment of a wind forecasting system;
FIG. 12 shows an embodiment of a ramp event summary table;
FIG. 13 shows a window accessible through the interface of FIG. 11.

DETAILED DESCRIPTION

Figure 2:
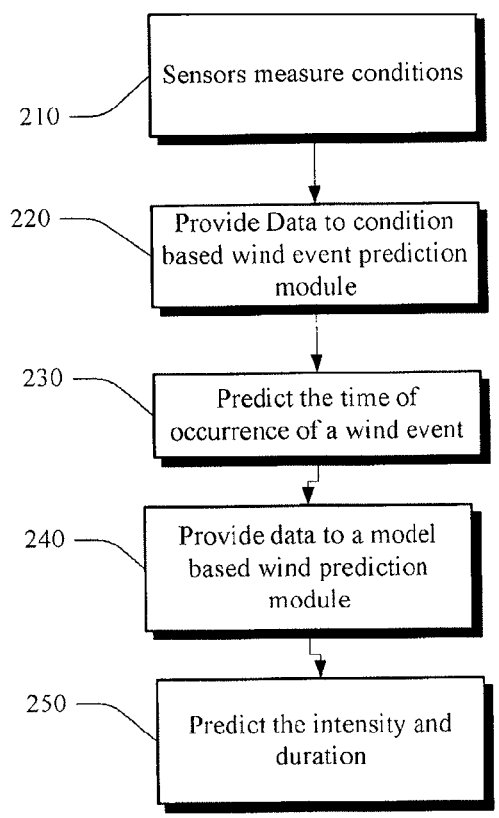
FIG. 2 shows an embodiment of a wind forecasting method.

In order to understand embodiments of a wind forecasting system and method, aspects of wind forecasting must be examined. An example of a useful forecast of wind informs a user of a location, a time at which the forecasted event will occur, and the characteristics of the forecasted event—basic what, when, and where. In various embodiments of wind forecasting systems described herein, the what, when, and where are described in relation to wind farms and the characteristics of wind that affect wind farms, such as ramp events. The characteristics of wind events or forecasted events that affect wind farms can equally affect other areas of interest as well, such as airports, crop regions, areas vulnerable to tornadoes, scientific research area (where experiments can be disturbed), etc.

1. Short-Term Wind Forecasts

In one embodiment, short-term wind forecasts can be targeted for prediction. The development of improved short-term forecasting methods is necessary for transmission scheduling and resource allocation. Short-term forecasting can be referred to as nowcasting. Generally, nowcasting can be a form of very short-range weather forecasting, covering only a very specific geographic area. For example, a nowcast can be defined as a forecast for the coming 12-hour period, based on very detailed observational data. More specifically, a nowcasting can be a detailed description of current weather conditions, from which one can extrapolate (project) the weather conditions for the following two hours. Of central focus for wind energy systems are wind energy forecasts on the 0-3 hour time horizon. A certain amount of lead time of 0-3 hours is necessary for transmission scheduling and the dispatching of resources.

In this short term forecast, for example, in the 0-3 hour time horizon, a significant challenge is the prediction of wind power ramp events. Wind power ramp events can be caused, in most cases, by an abrupt change in wind speed. They result in significant changes of the schedule of power generation over a short period and can cost wind power operators significantly. If the utility company is caught off guard and cannot accurately and reliably predict wind power ramp events, significant energy management issues arise. On the other hand, the company can work to reallocate or balance the energy grid if these incidents are properly predicted. In well-developed financial markets like the United States, accurate forecasts of wind power output can be valuable in the derivative energy market. Therefore, an accurate nowcasting (0-3 hours ahead) for example systems and methods for wind power ramp events are provided. Systems and methods described herein can be key components of a decision support system that helps wind power operators to minimize the adverse impacts of the ramp events on power generation and schedule.

In one aspect, a decision support system and method are provided that can be utilized by electric utilities and balancing authorities to improve reliability and financial performance by improving the short-term (0-to-3 hour, for example) forecast of wind energy generation and the timing, magnitude, and rate-of-change of ramp events to most effectively dispatch and/or curtail other power generators.

1.1 Sensor Array and Model-Based Prediction

In one embodiment, a wind forecasting system is used to predict a wind event in an area of interest 100 as illustrated in FIG. 1. The area of interest 100 may vary in size. A plurality of sensors 110 detects a plurality of conditions. The plurality of sensors 110 can be located remotely from the area of interest 100. The exact location of the plurality of sensors may vary; however, in the embodiment of FIG. 1, the plurality of sensors 110 is located approximately a distance d from the area of interest 100, where d is based on the average wind speed (w) of the winds in the direction 120 multiplied by the time (t) in advance the forecast is desired (d=w*t). For example, if the typical winds in the direction 120 are 40 miles per hour and a one hour advance forecast is desired, then the sensors 110 are located approximately 40 miles from area 100. Alternatively, sensors are located at varying distances, some close to the area of interest 100 and some farther away. [Insert limit to sensor distances.]

Sensors 110 detect a plurality of conditions. Conditions include, but are not limited to, wind conditions, humidity, electrical activity, temperature, etc. More information on detailed characteristics of weather conditions is described below. The plurality of conditions is processed by footprint wind event prediction module 130. The processes of the footprint wind event prediction module 130 are described in more detail below, in relation to weather conditions, algorithms, and models. In this embodiment, the footprint wind event prediction module 130 predicts when the wind event will occur. The area of interest 100 is where the wind event will occur. In order to predict the duration of the wind event, model-based wind prediction module 140 receives data from the plurality of sensors 110 and weather condition and forecast sources 150. Based on this input, model-based wind prediction module 140 predicts the intensity and duration of the wind event. The processes of the model-based wind prediction module 140 are described in more detail below, in relation to weather conditions, algorithms, and models. In many alternatives, additional sources of data are provided to the modules by National Weather Service Information and turbine sensor data.

In one embodiment of a method of wind forecasting, as shown in FIG. 2, in step 210 a plurality of sensors measure conditions. The sensors are located remote from the area of interest, by a distance d, similar to that described above in relation to FIG. 1. In step 220, data is provided to a footprint wind event prediction module. In step 230, the footprint wind event prediction module predicts the time of occurrence of a wind event. The processes of the footprint wind event prediction module are described in more detail below, in relation to weather conditions, algorithms, and models. In step 240, the plurality of sensors and other weather condition and forecast sources provide data to a model-based wind prediction module. In step 250, the model-based wind prediction module predicts the intensity and duration of the wind event.

In the embodiments described in relation to FIGS. 1 and 2, the systems and methods predict conditions periodically, or essentially constantly (accounting for the time required for the modules to process the data and make a prediction), or any measure in between. In one alternative to the system and method described above in relation to FIGS. 1 and 2, the model-based wind event prediction module does not receive data from the plurality of sensors. Below are described alternative embodiments to those described in relation to FIGS. 1 and 2. Although the embodiments are described in terms of discrete embodiments or sub portions of discrete embodiments, any of the aspects may be substituted in part or in whole into any of the other systems and methods described herein. Sensors used for the plurality of sensors 110 are described below. The wind prediction modules described above are implemented in general purpose computing hardware and software; however, alternatively, parts or all of the system are implemented in more hardware-based systems as well, such as field programmable gate arrays (FPGAs) or other more hardwired integrated circuits.

Figure 16A:
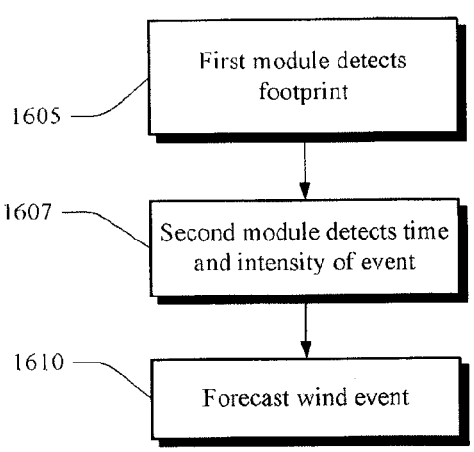
FIG. 16a-e show embodiments of a methods of detecting wind events.
Figure 16B:
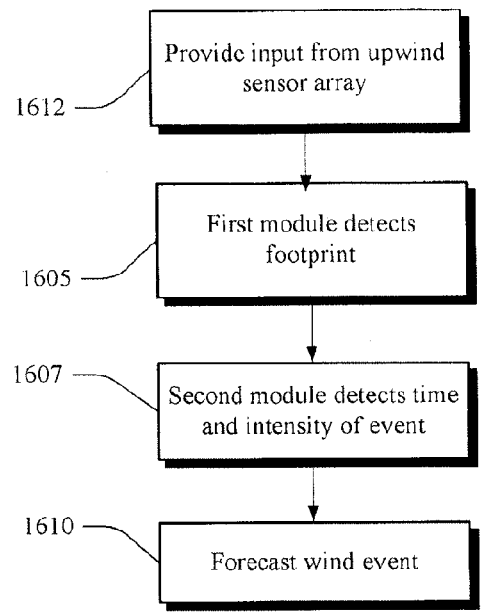

In one embodiment, shown in FIG. 16*a*, given an area of interest, a first module detects the footprint of a wind event that will affect that area of interest in step 1605. A second module determines the duration and intensity of the wind event in step 1607. In step 1610 the wind event is forecast. In one alternative, shown in FIG. 16*b*, sensor data is provided by a sensor array to the first module that is upwind of the area of interest in step 1612. Upwind, in this case, means that if the wind is coming from the North, then the sensor array is further north than the area of interest. In another alternative, the sensor data is provided to the second module. In another alternative, the sensor data is provided to both modules.

Figure 16C:
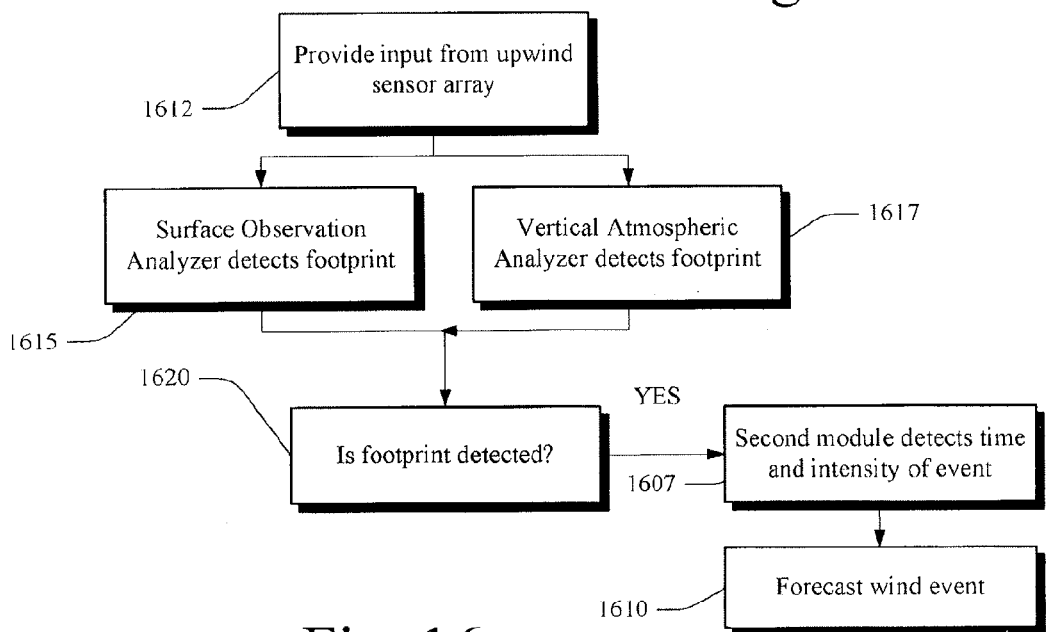

The first module may include a number of different footprint detection systems. One option is a surface observation analyzer. Another option is a vertical atmospheric analyzer. Another option is both a surface observation analyzer and a vertical atmospheric analyzer. The first module uses Fronts (marked by changes in temperature, moisture, wind speed and direction, atmospheric pressure, and often a change in the precipitation pattern), Mesoscale Features, such as shear line (marked by an increase in cumuliform clouds, often including towering cumulus and rain showers), dry lines (marked by downsloped air from higher terrain mixed to the surface during daytime heating, resemblance to a cold front although sloshing eastward during the day, and westward at night), outflow boundaries/squall lines (marked by convection that is strong and linear/curved, with the feature placed at the leading edge of the significant wind shift and pressure rise), lee troughs (marked by westerly winds aloft increase on the north side of surface highs, areas of lowered pressure that form downwind of north-south oriented mountain chains), sea/lake breezes (marked by during the afternoon, hot air on land ascends and a sea/lake breeze moves inland in the vacancy left by lowered pressures formed with warmed air over the land and the reverse at night), and Microscale features (may be ignored in the case of a large enough wind farm). In one alternative, the first module receives the sensor data from the sensor array. In another alternative, the first module receives sensor data from the sensor array and forecast data from other sources (for example the National Weather Service). In another alternative, the first module does not receive data from the sensor array, instead receiving data from remote sources (for example, the National Weather Service). In an alternative, sensor data is provided by individuals with home monitoring stations. Optionally, these home monitoring stations are connected to the Internet to provide frequent electronic updates. The first module determines the time of occurrence of the wind event. The processes of the first module are described in more detail below, in relation to weather conditions, algorithms, and models. FIG. 16c shows one embodiment of a method using a surface observation analyzer and a vertical atmospheric analyzer. Sensor data is provided by a sensor array to the first module that is upwind of the area of interest in step 1612. In step 1615 a surface observation analyzer detects the footprint of a wind event. In step 1617 a vertical atmospheric analyzer detects the footprint of a wind event. In step 1620, if a footprint is detected, then the method proceeds to step 1607 where the second module detects the time and duration of the wind event. In step 1610 a wind event is forecast.

The second module may include a number of different duration and intensity detectors. One option is a neural network. Another option is a mesoscale numerical model. Another option is a physical numerical model. Another option is an AR model. Another option is multivariate regression. Another option is Model Output Statistics. Another option is a combination of a neural network and a mesoscale numerical model. Another option is a combination of any number of the above. In one embodiment, the second module and the first module are combined into a single system. In one embodiment, the second module and the first module share some common components.

Figure 16D:
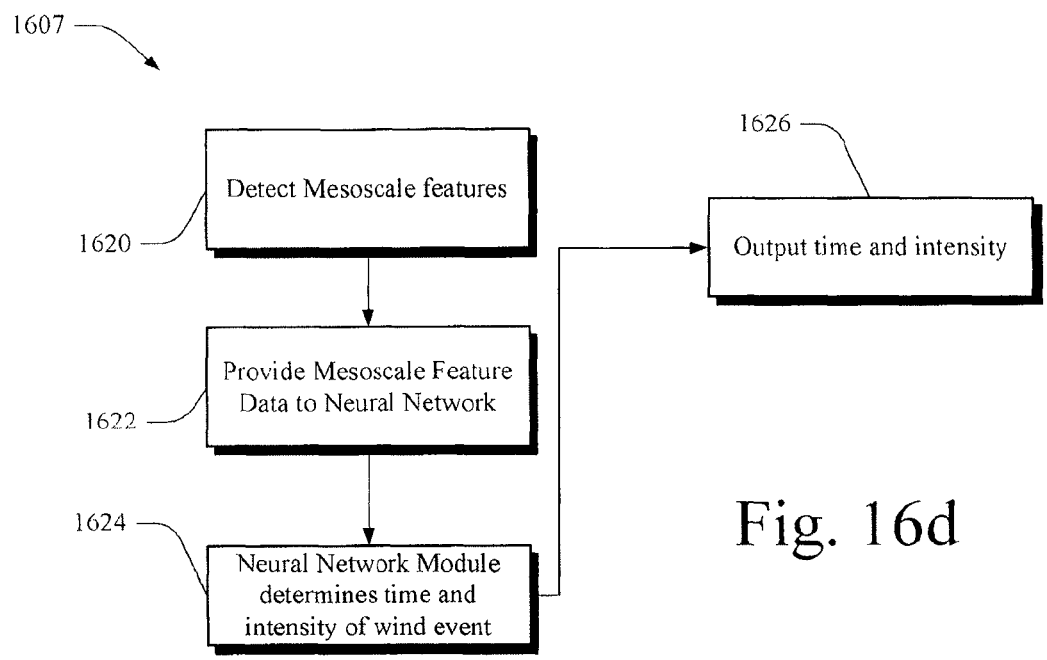

In an option including a neural network and mesoscale numerical model, the mesoscale model uses mesoscale features provided by outside forecast sources and the sensor data from the sensor array. More detail concerning the neural network and the mesoscale model are provided below. The mesoscale numerical model detects and quantifies Mesoscale Features, such as shear line (marked by an increase in cumuliform clouds, often including towering cumulus and rain showers). Fast four-dimensional data assimilation scheme is used to take advantage of the sensor data. Results mesoscale numerical model is used to aid the neural network. The neural network is trained by feeding it weather data. In one alternative, the variables as inputs to the neural network are mainly up-wind meteorological variables like wind speed, wind direction, pressure, temperature, and humidity. In one alternative, instead of training the neural network indiscriminately based on all of the historical data, the neural network uses carefully selected data sets which involve WPREs only. The steps that take place at the step 1607 may be expanded as shown in FIG. 16d. In this alternative, step 1620 a Mesoscale Model Module detects mesoscale features. In step 1622 these features are provided to a Neural Network with other information concerning weather conditions. In step 1624, the Neural Network determines the time and intensity of the wind event. In step 1626, these features are output.

Figure 16E:
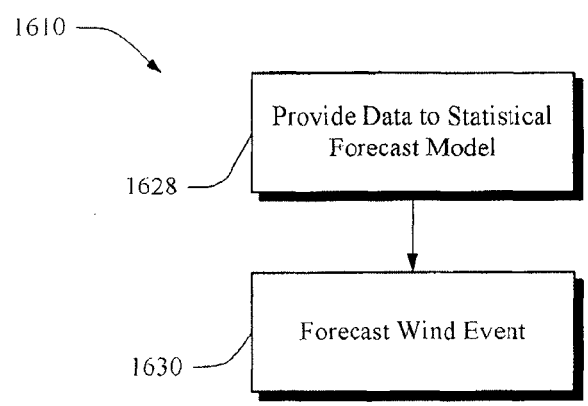

In alternative to the embodiment that includes, a first module that detects the footprint of a wind event that will affect that area of interest and a second module that determines the duration and intensity of the wind event, the embodiment further includes a third model. The third module is a Statistical Forecast Model. In one option, the Statistical Forecast Model may use a multivariate regression. In another option the Statistical Forecast Model may use an AR model. In another embodiment, the Statistical Forecast Model is a neural network and an AR. In this alternative, the third module receives inputs from the first module and the second module, and determines the timing, duration, and intensity of the wind based on a synthesis of the data from the first and second module. In the FIGS. 16a-c, step 1610 may be expanded to include a Statistical Forecast Model as shown in FIG. 16e. The Statistical Forecast Model receives available data in step 1628, and provides a forecast in step 1630.

In one alternative, the wind event is wind of a certain magnitude. In another alternative the wind event is a physical manifestation of wind on another system. For instance, wind and the characteristics of wind can be predicted and then the effect of the wind on another system can be predicted. Using known characteristics of the system and historical data concerning the system, a model for the affect of wind on the system may be produced. In the case of wind farms, the wind can be predicted, and then it can be predicted how this wind will effect the wind farm. In an alternative, the wind and the characteristics of the wind are not predicted. Instead, the intermediate step of predicting the wind is eliminated and simply what will happen to the physical system of interest is predicted. For instance, instead of predicting the wind and then predicting from the wind a WPRE, the WPRE event is predicted directly. In this case the models are trained and created specifically in relation to predicted the WPRE. There is no need to specifically model the wind, only the WPRE. This is not meant to preclude the prediction of some of the characteristics of the wind, however, in this alternative, it is not necessary to predict every aspect of the wind forecast. In this alternative, in the case of neural networks, the prediction is therefore more direct, which eliminates some inaccuracies from the conversion of wind to WPRE.

In alternative to the embodiment that includes, a first module that detects the footprint of a wind event that will affect that area of interest and a second module that determines the duration and intensity of the wind event, the second model includes a neural network. This system is an improvement over a system that uses a neural network or neural network in combination with other systems, since it informs the neural network when a wind event will occur.

Neural networks or systems that primarily rely on neural networks for the predictions of events suffer from the disadvantage that neural networks are good at recognizing patterns, not predicting events. Neural networks are constantly recognizing patterns, since that is what they are designed to do even if no pattern exists. Therefore, the neural network is assisted by the first module, which informs the neural network and overall system that now an actual wind event is occurring; now it is time to recognize the pattern and tell more about what is happening. If the system were primarily driven by the neural network, then the neural network would constantly recognize patterns, even if there were not any to recognize.

By way of analogy, humans and the human mind are programmed to recognize faces. This programming, similar to a neural network, causes humans to recognize faces in animate items, where no face exists (e.g. humans recognize faces very limited cues representing gestalt of a face: :-); although this keyboard emoticon is simply two dot, a line, and a semicircle, it is readily recognized as a face). Faces are recognized by the human mind anywhere where basic facial characteristics exist. Ultimately, the human mind knows that these objects aren't actually human faces, even though some of the characteristics match the patterns programming into the human neural network since other analysis abilities inform the neural network in humans designed to recognize faces. In this way, the wind event prediction system and neural network are informed that an event is occurring. Now is the time to recognize the pattern.

Described below herein is more explanation of the details and various pieces that relate to the embodiments described in relation to FIGS. 1, 2, and 16a-e.

1.1.1 Wind Power Ramp Event

There are a number of wind events that are of interest to users of a wind prediction system. One such event is a Wind Power Ramp Event.

In one embodiment, a wind forecasting system is used to predict wind events for a wind farm. The wind forecasting system is based on a combination of inputs including wind conditions, a mesoscale model, and a neural network. In this embodiment wind conditions are used to predict the occurrence of a wind event. In one alternative, the wind event may be a Wind Power Ramp Event (WPRE). In general terms, a WPRE is a change in the wind that will result in a significant change in the power produced by a wind farm.

The relationship between power output (P) from a wind turbine and wind speed can be expressed as:

$$P = \frac{1}{2} C_p \rho A V^3 \quad (1)$$

where $C_p$ is the power coefficient, $\rho$ is air density, A is the rotor swept area, and V is the wind speed. The power coefficient describes that fraction of the power in the wind that may be converted by the turbine into mechanical work. It has a theoretical maximum value of 0.593. Equation (1) shows that wind energy varies as the cube of the wind speed. Therefore, any small change in wind speed can result in a very large variation of wind power output.

Figure 3:
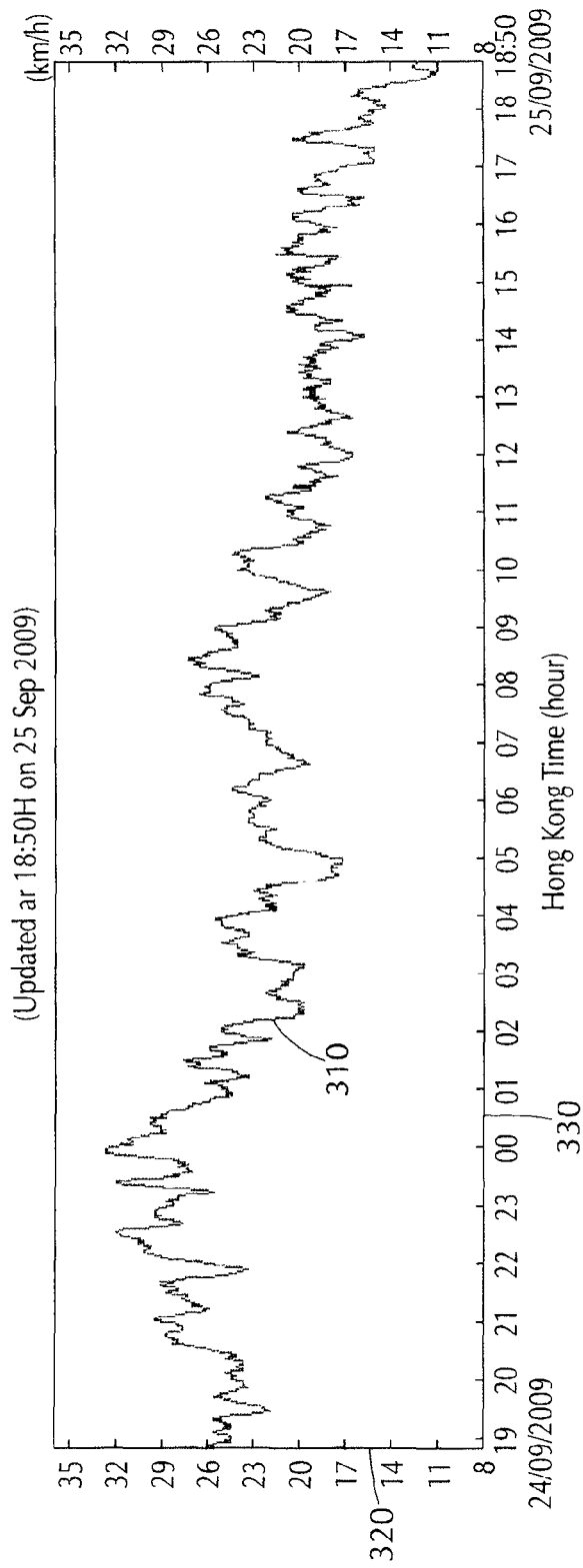
FIG. 3 shows an exemplary graph of wind conditions vs. time depicting volatility.

Wind is characterized in part by volatility. FIG. 3 shows 10-min averaged wind speed at Hong Kong airport. It is seen from the figure that wind speed 310 shows many sporadic spikes, plus a trend in general. The scale for the X axis 320 is in hours, and the scale for the Y axis 330 is in km/h. Such character of winds inevitably causes dramatic ups and downs in wind power output. Under some particular situations, a rapid change in wind speed can cause a dramatic WPRE 410 as shown in FIG. 4.

Figure 4:
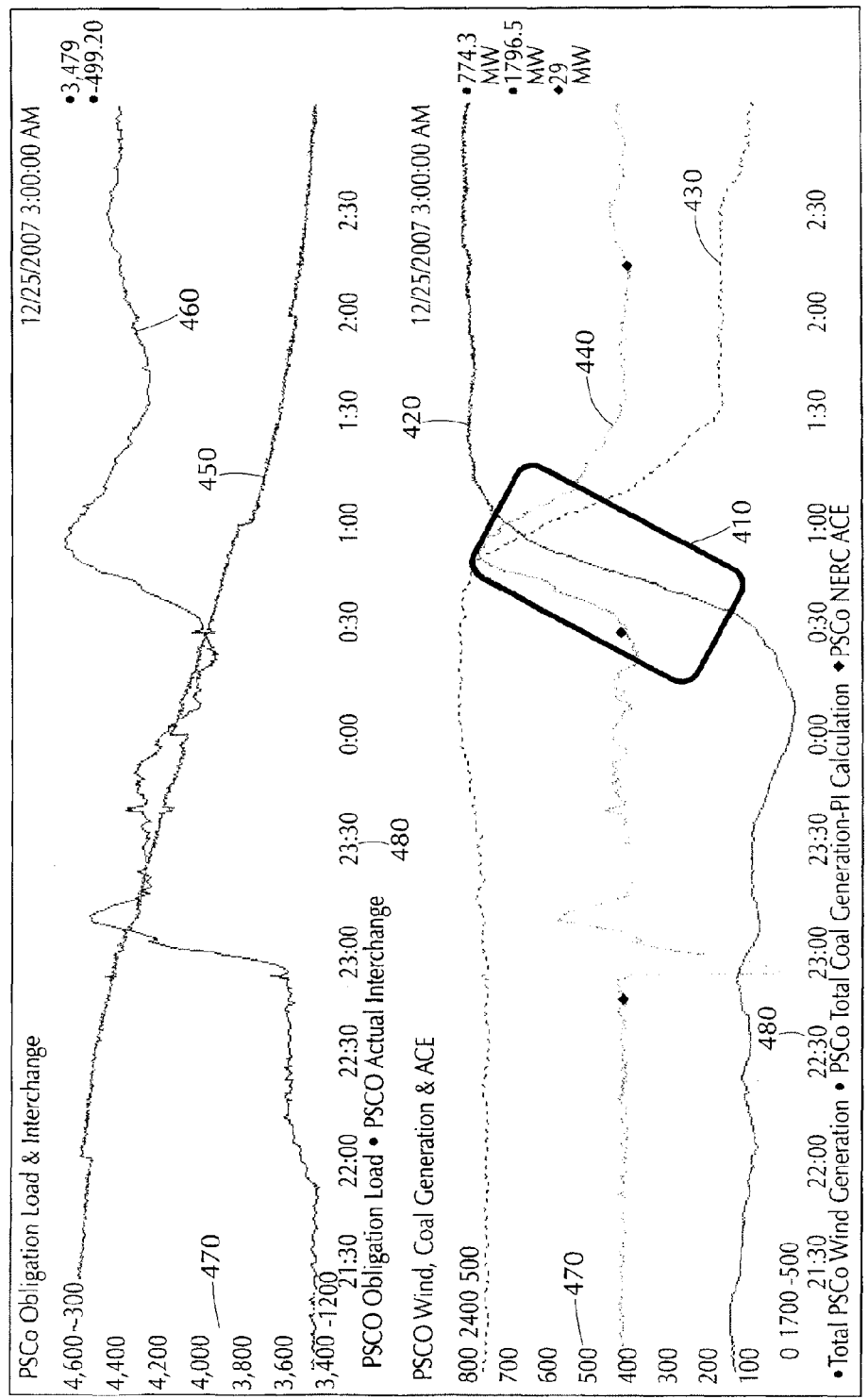
FIG. 4 shows a number of plots of power provided from various sources and a number of load obligations.

FIG. 4 shows a number of features related to power management. The Y-axis 470 measures in megawatts (MW), and the X-axis 480 measures in hours. The obligation of the power company 460 is shown in the top graph. This is a measure of the power that the power company needs to provide to service its customers. The power company interchange 450 shows the amount of power that the power company has to buy from other sources to serve the needs of the customers. As can be seen in the graph, as the time of day advances to the early morning, the power needs of the customers goes down.

The lower graph shows the coal power production 430, the wind power production 420, and the gas power production 440. As can be seen, the power produced from each source is modulated in order to keep the power supply consistent. Consequences flow from the inability of the power company to keep the power supply constant. For instance, if not enough power is produced, then the power company either has to buy power from another source or brownouts will occur. If too much power is produced and it is not properly anticipated so that it can be sold to another source, then regulatory fines may be incurred and portions of the electrical grid may be damaged.

A sudden change in wind speed and wind power output are the results of changes in weather conditions. In one alternative, a power ramp event is defined as a power loss or gain of 10-20% of total output. Another measure of a ramp event is defined as an absolute change of power output greater than 100 MW. The ramp events can be categorized as ramp-up and ramp-down events. The former are caused by:
 a. Frontal systems;
 b. Dry lines;
 c. Convection (early evening), and
 d. Low level jet.

The ramp-down events are related to:
 a. Weakening of pressure gradient;
 b. Shallow, cold air mass and turbulent mixing;
 c. Sudden cooling of near-surface layer and increased stability; and
 d. Turbine cut-off due to high winds (this means that the power output is sensitive to a small change in wind at or around cut-off speed, at which a turbine shuts down for safety reason).

While the ramp-up events may show an annual peak in late winter to summer, the ramp-down events show no annual pattern. Occurrence and magnitude of all ramp events are related to weather systems which are of different spatial and temporal scales.

1.1.2 Other Wind Events

Numerous other wind events are of interest to users. Although much of the present disclosure is described in relation to WPREs, the principles may be equally applied to other areas of interest. The area of interest 100, as described in relation to FIG. 1, clearly may be a wind farm. In alternative embodiments, the area of interest 100 may be crops, especially those crops that may be adversely affected by strong winds. In another alternative, the area of interest 100 is a town or other settlement in an area with a high risk for tornadoes or high winds. In another alternative, the area of interest 100 is an airport. Any area that may be positively or adversely affected by wind may be defined as the area of interest. It is expected that as enough sensor networks are deployed, the available data for predicting wind events as disclosed herein will begin to overlap and increase, making wind event prediction more comprehensive.

1.1.3 Volatility

Volatility is one aspect of the characteristics of a wind event. A volatility index (VI) is basically a measure of variation of a variable/process from the average value (or zero) over a certain period. A commonly used measure for volatility is the variance. A larger variance means a volatile situation, and a smaller variance indicates a mild/damped situation. Depending on customer requirement, the VI, which can be normalized to 0-100 or any range, can refer to total power output or wind speed. In case of VI for wind speed, a separate power curve/model is needed to convert VI for wind speed to VI for power output. As shown in FIG. 3, volatility may vary significantly over time.

Volatility is a characteristic of wind this is predicted in some alternatives. Volatility affects how wind will affect other physical systems. Volatility can be thought of as gustiness. For example, a very gusty wind pattern in some cases will not produce as much wind as a constant and consistent wind pattern, since intermittent produces less force over time. In one alternative, volatility is used in the prediction of the strength of a WPRE.

In one alternative, a volatility index for forecast power output or wind speed includes forecast error or uncertainty. A forecast error differs from volatility in that the former is model-inherited while the latter is barely a measure for the fluctuation of observation or forecasts around a historic mean (or zero) over a predefined period.

The calculation of simple VI, without taking probability and forecast uncertainty into account, can be done in the following steps:
1. Assume the following variables:
    X: total power output or wind speed; discrete
    n: length of history data, discrete
    µ: mean (or zero) of X over the period of n
    V: variance of X
    m: length of forecasts ahead, discrete (n and µ should be configurable as they depend on customer interests/requirements).
2. Calculate historic µ, if µ is not 0

$$\mu = \frac{1}{n}\sum_{i=1}^{n} x_i$$

where xi is observed X at time i.
3. Calculate historic variance $$V = \frac{1}{n}\sum_{i=1}^{n} (x_i - \mu)^2.$$

4. Calculate VI over forecast period $$VI_j = \frac{(x_j - \mu)^2}{V} \times 100\%$$

where xj is the forecast X at time j and j=1, 2, ... m.
5. If VI is based on wind speed and forecasts are wind speed, do the following to convert wind speed volatility to power output volatility by power model f; otherwise, skip over:

$$VI_j' = f(VI_j).$$

This gives us a volatility index at each forecast time/point.

In one alternative, the calculations (2-4) are based on actual power output if customers are interested in volatility of power output.

1.1.4 Weather Systems

One characteristic that is used to predict the occurrence of wind events is the occurrence of weather systems. Theses characteristics may be considered by the prediction modules described above and herein, based on the data provided to them. As described above in relation to FIG. 16, the first module that detects footprints uses many of these characteristics to predict wind events, as do other models described below.

1.1.4.1 Synoptic Scale Feature: Fronts

Fronts are the most common synoptic or global scale weather features. In meteorology, they are the leading edges of air masses with different density. When a front passes over an area, it is marked by changes in temperature, moisture, wind speed and direction, atmospheric pressure, and often a change in the precipitation pattern. For example, passage of a cold front is often accompanied by a drop in air temperature, increase in pressure, and strong winds that are likely to cause wind ramp events.

1.1.4.2 Mesoscale Features

Mesoscale systems, a few hours and up to 100 km, affect wind farms with complex interactions between the wind, moisture, temperature, and pressure on this scale. The stability of the atmosphere may indicate the future occurrence of many of the phenomena. Variations on this scale determine the availability of the wind resource and are important for scheduling and integrating the variable generation into the national grid.

(a) Shear Line

A shear line is an area in a low pressure trough, usually in the tropics, within which wind direction changes significantly over a relatively short distance. The area is marked by an increase in cumuliform clouds, often including towering cumulus and rain showers. It may become more active with thunderstorms, and the turbulence and circular motion of winds may assist in the formation of a tropical storm.

(b) Dry Line

A dry line is a similar phenomenon to a frontal zone (boundary between moist and dry air) but at a much smaller scale. By definition, dry lines are formed in response to downsloped air from higher terrain mixed to the surface during daytime heating. In three dimensions, a dry line resembles a cold front, though it normally sloshes eastward during the day, and westward at night, caused by density differences.

(c) Outflow Boundaries/Squall Lines

Organized areas of thunderstorm activity not only reinforce pre-existing frontal zones, but can also outrun cold fronts in a pattern where the upper level jet splits into two streams, with the resultant mesoscale convective system (MCS) forming at the point of the upper level split in the wind pattern running southeast into the warm sector parallel to low-level thickness lines. When the convection is strong and linear/curved, the MCS is called a squall line, with the feature placed at the leading edge of the significant wind shift and pressure rise. Even weaker and less organized areas of thunderstorms will lead to locally cooler air and higher pressures, and outflow boundaries exist ahead of this type of activity.

These features will commonly be depicted in the warm season across the United States on surface analyses, and they lie within surface troughs. Squall lines can cause short and sharp wind power ramps.

(d) Lee Trough

When westerly winds aloft increase on the north side of surface highs, areas of lowered pressure will form downwind of north-south oriented mountain chains, leading to the formation of a lee trough. If moisture pools along this boundary during the warm season, it can be the focus of diurnal thunderstorms.

(e) Sea/Lake Breeze

Sea/lake breeze occurs mainly on sunny and warm days when the land surface warms up. During the afternoon, hot air on land ascends and a sea/lake breeze moves inland in the vacancy left by lowered pressures formed with warmed air over the land. This process reverses at night, leading to a land breeze and wind acceleration offshore. If pressure gradients are large enough, sea/lake or land breezes can cause small to moderate wind ramps.

1.1.4.3 Microscale Features

Microscale features are those phenomena with a timescale of a few minutes and spatial scale of up to 1 km. They affect individual turbines. Motions on this scale are chiefly turbulent and irregular, and affect the choice of location for individual turbines and the stresses on them. They can be ignored in the prediction of aggregated power at a large scale such as for a wind farm.

1.1.4.4 Summary

In some embodiments, the above characteristics are used to detect the footprint of a wind event and the duration and intensity of the wind event. In some alternatives the surface observation analyzer and the vertical atmospheric analyzer use these characteristics to identify footprints.

1.2. Wind Power Forecasts in General

There are two ways to make wind power forecasts at a large scale:
a. Forecast wind speed, and then convert wind speed to wind power via a power curve (FIG. 5); and
b. Forecast power output directly.

Figure 5:
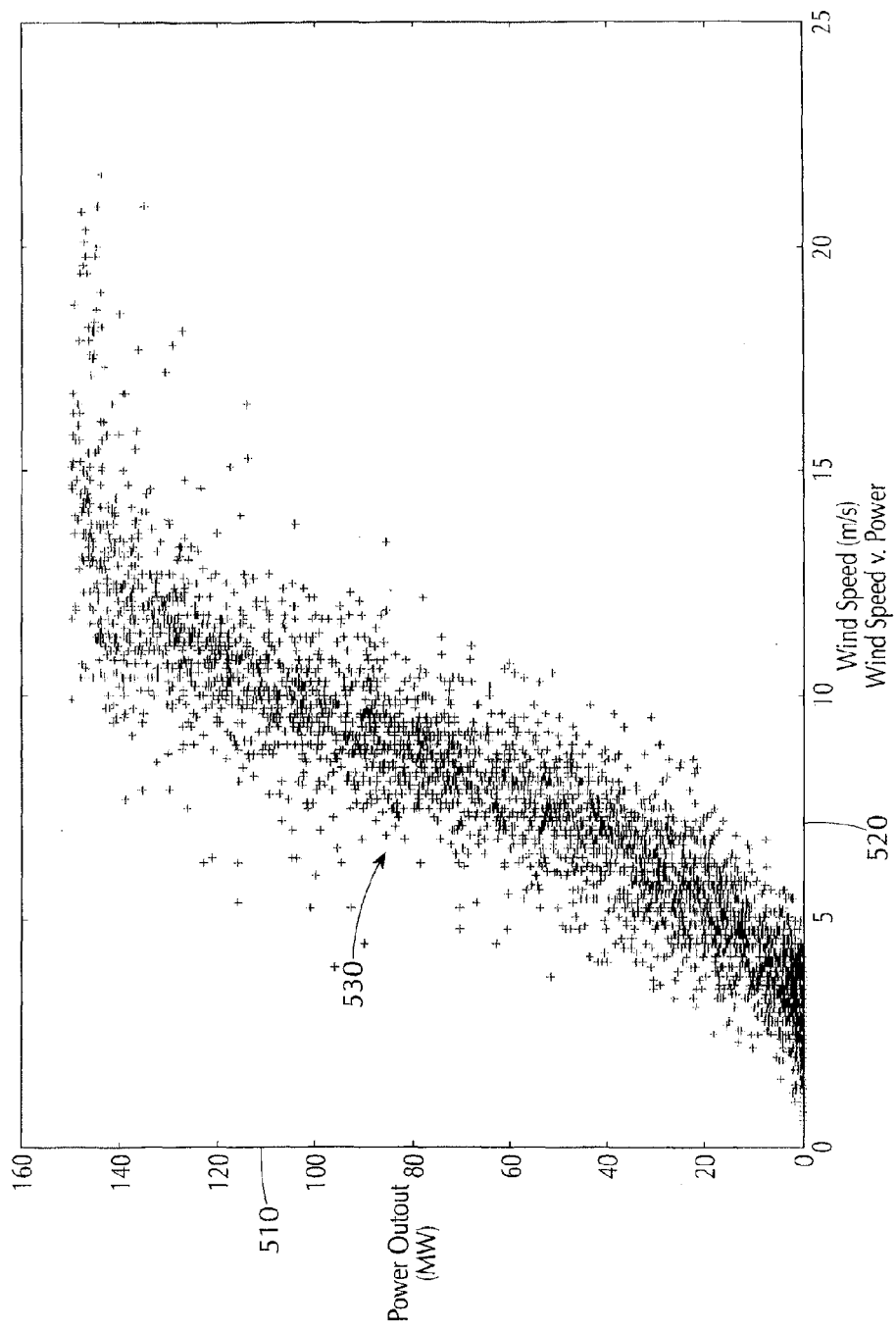
FIG. 5 shows an exemplary graph of wind speed vs. wind power.

In FIG. 5, the y-axis 510 has units of power output by a wind farm in megawatts (MW). The x-axis 520 shows wind speed in meters per second. The plotted points 530 show the conversion.

The models/methods discussed in this disclosure can be applied in either way. However, it should be noted that the 'fat' curve or deviated spots in FIG. 5 show a great degree of uncertainty attached to the conversion of power output from wind speed. Factors such as volatility may affect the ability to accurately convert wind speed to power.

In order to mitigate adverse impacts effectively from a wind ramp event, the energy company needs to know Timing of the occurrence; Duration of the event; and Magnitude of the ramp.

Because of volatile nature of WPREs, prediction of the events is extremely difficult.

Prediction of wind power output can be classified as:
a. Statistical;
b. Physical (or numerical); and
c. Hybrid: statistical plus physical.

All of these methodologies may be incorporated into the wind prediction systems and methods described herein. Alternatives described herein are simply examples of systems and methods that may be implemented in light of this disclosure.

1.2.1 Statistical Methods/Models

In some alternatives, statistical methods/models are used. Wind speeds are positively and strongly correlated over a short period of hours. This correlation is seen in that low values tend to follow low values and high values tend to follow high values. Furthermore, wind speeds have a property known as medium-term memory; and its hallmark is a slowly decaying autocorrelation function. The existence of the "memory" is important when attempting to forecast and quantify wind-associated phenomena such as wind power output.

As noted above, many of the statistical methods described herein are used in embodiments of wind event prediction systems and methods. See the above description of FIGS. 16a-e for options on where these methodologies are incorporated to the wind event prediction systems and methods described herein.

A collection of measurements of wind speed or observation of wind power output over a time period is regarded as a time series, which can be expressed as:

$$\{x_1, \ldots, x_{t-1}, x_t\}.$$

Statistical approaches, based the time series, try to exploit obvious or non-obvious relationships embedded in the time series (in the past), and then apply the relationships in extrapolation into the future.

A family of statistical methods applied in the prediction include:
a. Persistence;
b. Multivariate regression;
c. Autoregressive (AR) model; and
d. Artificial intelligence (AI).

1.2.2 Persistence

The simplest statistical prediction is known as persistence forecast. The persistence method d assumes that the conditions at the time (t) of the forecast will not change, and the prediction is set to equal to the last available measurement. In other words, prediction is simply the last measured value:

$$\hat{x}_{t+1} = x_t \tag{2}$$

The persistence method works well for a short period when weather conditions change very little and features on the weather maps move very slowly. However, if weather conditions change significantly, the method usually breaks down and performs badly. Although it is very simple, it is effective under certain conditions.

1.2.3 Multivariate Regression

A multivariate technique is the multiple linear regression:

$$\hat{x}_{t+1} = a_0 + \sum_{i=1}^{k} a_i y_i \tag{3}$$

where x is the prediction (wind speed or power output), y are predictor variables, and k denotes the number of the predictor variables. The predictor variables can include observations (such as air pressure, temperature, humidity, etc.) at current and previous times. Each of the predictor variables has its own coefficient (a). All of the coefficients are derived from optimal fitting (e.g., least squares) to the historical data. Forecasts then are made by the equation. In some alternatives, Multivariate regression is used.

1.2.4 AR Model

A short term prediction technique is the more sophisticated autoregressive or autoregression (AR) model. It takes into account the fact that the atmospheric variables (like wind speed) have "memory", and the model is defined as:

$$\hat{x}_{t+1} = a_0 + \sum_{i=1}^{p} x_i \tag{4}$$

where a are the autoregression coefficients, x are the time series of wind speed, and p is the order (length) of the autoregression. In summary, Equation (4) shows that the prediction of wind speed or wind power can be estimated by a linear weighed sum of previous observations. The weights are called the autoregression coefficients. In some alternatives, AR models are used.

1.2.5 AI Model

Figure 6:
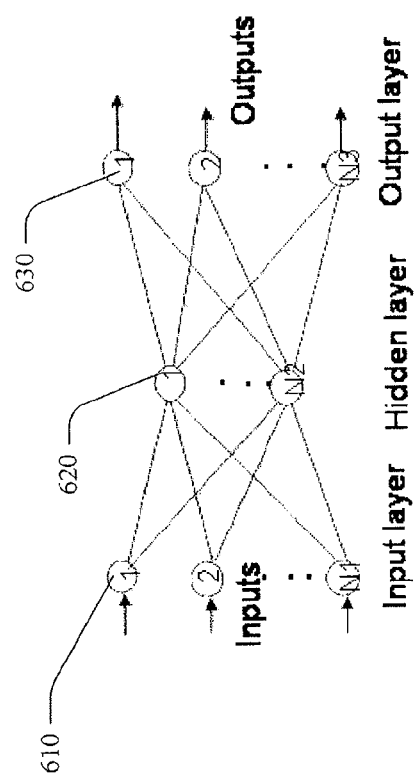
FIG. 6 shows an exemplary Artificial Neural Network (ANN)

AI attempts to simulate the human brain for searching, cognition, learning, and reasoning. One AI technique is called Artificial Neural Network (ANN). An example of an ANN model is shown in FIG. 6. In the figure, the ANN consists of three layers: input 610, hidden 620, and output 630. The input layer distributes meteorological variables. The output layer are wind or wind power predictions, and the hidden layer performs the mapping between the input and output layers. N1, N2, and N3 are numbers of neurons at the input, hidden, and output layers respectively. Once the ANN is trained with historical data, it is expected to be able to "remember" and, after comparing with current input, "pick up" the right mapping relationship, and to make a projection into the future by the relationship.

The ANN model is also used to predict directly power output instead of winds. Although viable in certain circumstances, ANN is good at pattern reorganization, not forecast. In some alternatives, ANN is used.

1.2.6 Physical Models

Physical models are based upon fundamental physical principles of conservation of mass, momentum, and energy and the equation of state for the atmosphere. These models consist of a set of differential equations that are numerically solved on a three-dimensional data grid with a finite resolution. In most (if not all) cases, they are specially adapted to simulate the atmosphere and involve various data assimilation schemes.

The physical approach can employ models of different scale from synoptic scale, mesoscale, and microscale. Very often, a single mesoscale model, taking forecasts from synoptic scale NWP model as input, is used to predict wind power generation with downscaling scheme. Among many numerical models, the Weather Research & Forecasting (WRF) model stands out for its extensive research efforts and popularity. WRF is a mesoscale model with a capability of a fine resolution of 1 km. The numerical model output can be either for the geographical point of the wind farm or for a set of grids surrounding the farm.

In some cases, an ensemble prediction system is applied. The system generates multiple realizations of weather variables by using a range of different initial conditions for a numerical model, or a range of different models. The frequency distribution of the different realizations or models provides an estimate of the density function, upon which probability forecasts are derived. An ensemble forecast system requires huge computational resources, as well as extensive knowledge and experience. For instance, the European Centre for Medium-Range Weather Forecasts (ECMWF) produces global weather forecasts with 51 ensemble members. Although ensemble predictions are able to capture the dynamic change over time in the density of a weather variable, they tend to underestimate the spread of the density. For this reason, in some alternatives, the ensemble forecasts need to be calibrated when transforming to a forecast density.

1.2.7 Hybrid Models and Model Output Statistics (MOS)

Both statistical and physical models have advantages and disadvantages, and their performance varies with the forecast horizon. In general, statistical models are simpler, cheaper, and faster to develop. Also, they involve far less computing power and resources. However, statistical models perform well only in a very short term (0-3 hours ahead). Physical models outperform statistical models after the forecast horizon.

In one embodiment, statistical and physical models are combined together to become hybrid. Hybrid models use state-of-the-art combination methods, and they often offer a superior forecasting system.

In one embodiment, a family of Model Output Statistics (MOS) methods is applicable in wind power forecasts. MOS is an objective weather forecasting technique which consists of determining a statistical relationship between the parameter being forecast and values calculated by a numerical model. It is, in effect, the determination of the "weather-related" statistics of a numerical model.

1.2.8 Model Applicability

Above are described various models that are used in various embodiments of the systems and methods for wind prediction. Applicability of types of forecast models is shown in Table 1. In one embodiment, a 0-3 hour horizon, a statistical model (particularly the AR model) combined with an ANN is used. Beyond that horizon, physical models, plus MOS, are used.

TABLE 1

Advantages And Disadvantages Of Different Models/Methods

| Model | Characteristics | Application |
|---|---|---|
| Persistence | Simplest; benchmark to beat | Useful primarily in the first hour |
| Multivariate regression | Easy to develop | Applicable to local area |
| AR model | Sophistication; effective | Less effective with nonstationary and nonlinear problem |
| ANN | Able to tackle nonlinear process; patter recognition | Questionable performance in making forecasts |
| Physical models | Dominated effectiveness after the first a few hours | Not so effective in the first a few hours; requires huge resources and expertise |
| Hybrid models | Get merits from different models | Needs to be trained |

1.3 Prediction of WPREs

The prediction of WPREs differs from the general wind power forecasts because of special features of the WPREs, i.e., abruptness and nonlinearity. It is these features that make WPRE forecasting extremely difficult.

To make the difficult problem simpler, the prediction process for WPREs can be decomposed into two actions:

a. Prediction of start and end of the ramp event (see red circles in FIG. 7); and b. Prediction of power generation outside the red circles 720.

Figure 7:
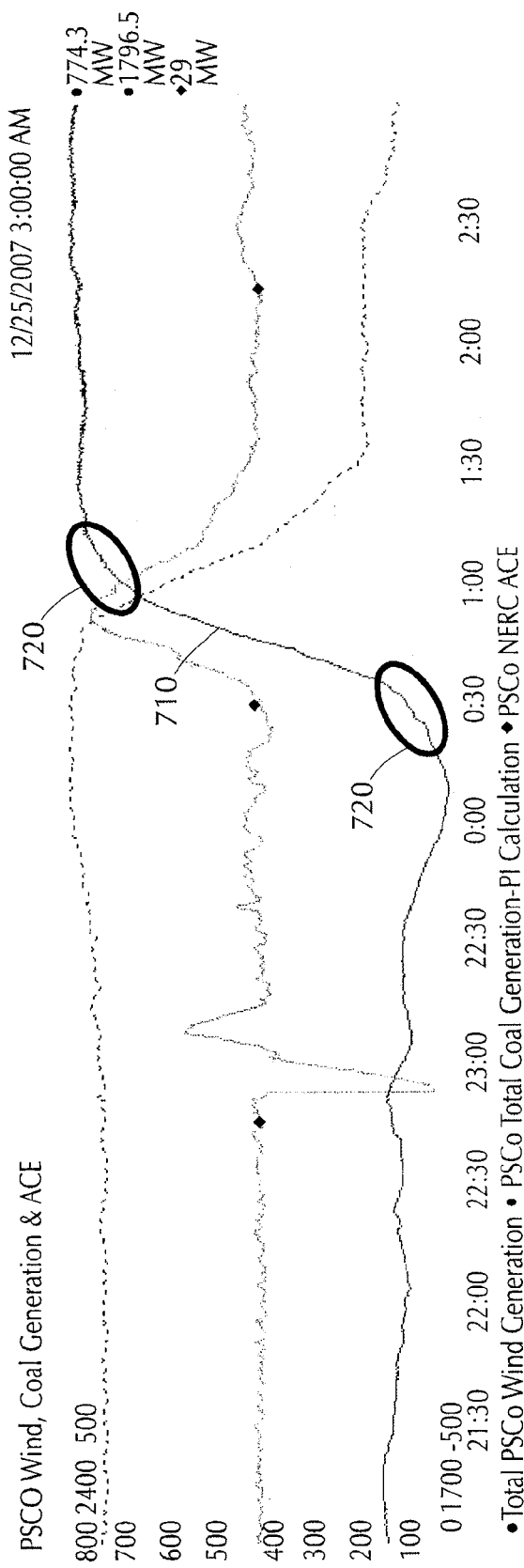
FIG. 7 shows an exemplary graph of power generation from a variety of sources.

In FIG. 7, the line 710 shows the wind power generation. The methods and systems described herein allow for prediction within the red circles 720 in FIG. 7. The focusing point should be on the detection or prediction of start and end of such events.

1.3.1 Challenges

The issues overcome by the embodiment of the model described in Section 2 below are described herein. Predicting start and end moments of a WPRE is crucial to the success of developing a WPRE prediction system. However, such prediction is extremely challenging because of the following issues.

(a) Model Incapability

Previous models/methods are of limited power to predict WPREs and of limited success. Take an AR model as an example. It has been proven a successful tool for nowcasting in general. However, the AR model can only "see" and apply a hidden correlation that exists in the time series. This means that the AR model is unaware of a WPRE until the WRPE has become obvious for some time. As a result, the AR model alone is unlikely to be able to predict the start and end time of WPREs correctly. On the other hand, the capability of a physical model is hampered by not only insufficient understanding of underlying processes of WPREs, but also computational limits (coarse resolution, long "spin-up" time, etc.).

(b) Sensitivity of Turbine's Response to Winds

Prediction of a sudden change in wind speed has been difficult. The response of turbines to winds at cut-in and cut-off levels make prediction of a WPRE even more difficult. Winds fluctuate frequently and swiftly. A small fluctuation around cut-in or cut-off speed can cause a large gain or loss of wind power or a ramp event.

Furthermore, once winds reach and move above a speed of about 15 m/s, wind turbines begin to perform at their maximum (100%) capability. This means that the relationship between wind power output and wind speed is broken when wind speed is between 15 m/s and a cut-off speed (25 m/s). Therefore, a direct approach to simulate the aggregated wind power time series must take this into account.

(c) Cluster of Turbines

Wind turbines tend to be clustered in a small area for economic reasons. The compacted cluster means that the wind farm is highly sensitive to the change of winds on a local scale, while a localized weather phenomenon (e.g., a local gust front) is harder to observe and to predict.

2. WPRE Prediction

The methods and systems related to WPRE nowcasting take all these factors into consideration and take a new lead. The new lead comes from a simple but important fact; i.e., most, if not all, weather systems leave "footprints" on the surface or near the surface. Based on this fact, a ramp event can be observed or detected by observations at surface levels and near-surface levels. Therefore, in one alternative, a set of densely distributed surface observation stations is used. A high spatial resolution off-site observation network, including tower masts, a wind profiler, and an Atmospheric Observation Network ((AON) see FIG. 8) serves this purpose and should become an important part of the WPRE nowcasting system.

Figure 9:
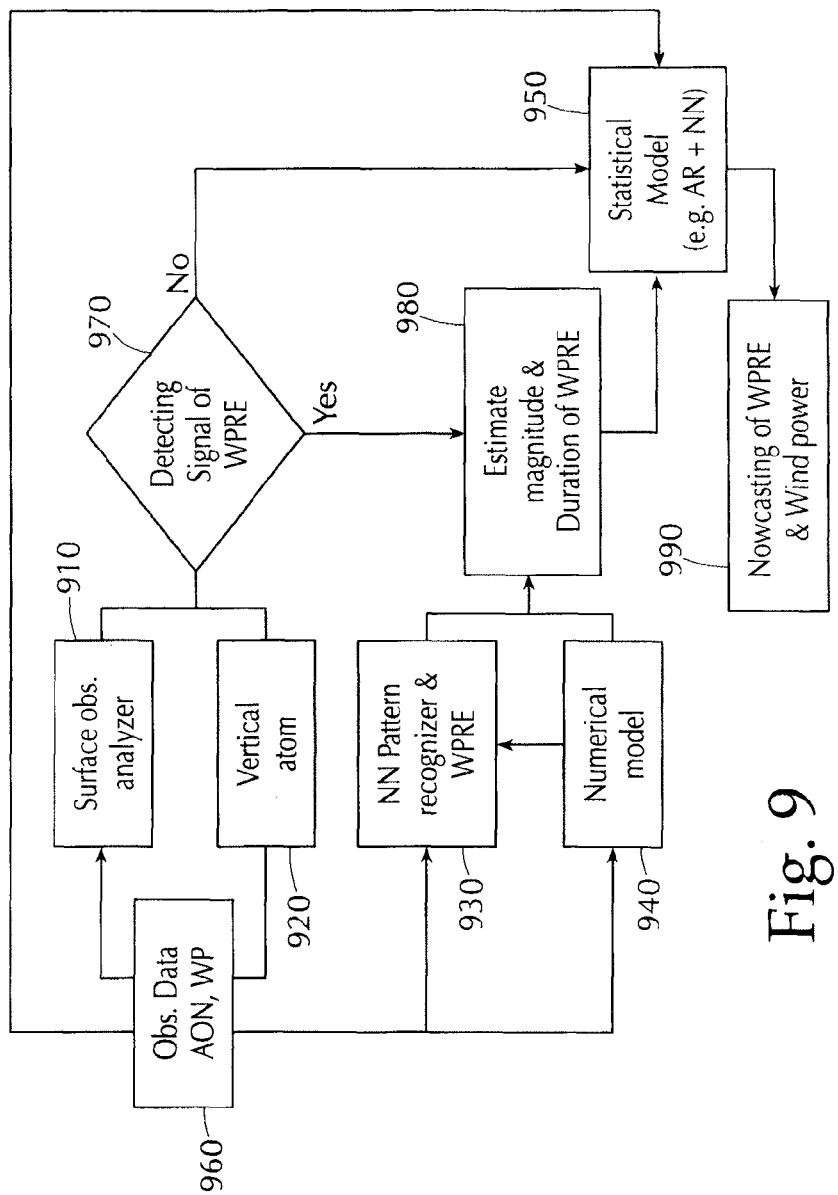
FIG. 9 shows one embodiment of a system for predicting WPREs.

One embodiment of a system for predicting WPRE is shown in FIG. 9. The multi-model system consists of the following components:

a. A surface observation analyzer 910;
b. A vertical atmospheric analyzer 920;
c. A mesoscale numerical model 930;
d. A neural network pattern recognizer 940; and
e. A statistical forecast model 950.

As can be seen in FIG. 9, observation data from the AON and Wind Production 960 is provided to all of the identifiers and models: surface observation analyzer 910, vertical atmospheric analyzer 920, mesoscale numerical model 930, neural network pattern recognizer 940, and statistical forecast model 950. Analysis by the surface observation analyzer 910 and vertical atmospheric analyzer 920 provide for the detecting of a WPRE signal in decision step 970. If a WPRE is identified, then the Neural Network 930 and numerical model 940 estimate a magnitude and duration of the WPRE in step 980. The result is fed into statistical model 950, and a nowcast is produced in step 990. If no WPRE is detected in decision step 970, then no estimate of the WPRE is made. Similarly, FIGS. 1, 2, 16*a-e*, describe similar embodiments and variations. More detail on the specific embodiment of FIG. 9 is described below.

2.1 Surface Observation Analyzer (SOA)

The aim of the analyzer, together with the Vertical Atmospheric Analyzer, is to detect early signals of a ramp event, based on fine spatial and temporal observation data around (or off-site) and at (or on-site) the wind farm. The analyzer is based on the fact that any weather system that causes a WPRE is associated with the following features:

a. significant change in wind speed;
b. strong vertical and horizontal wind shears;
c. pressure drop or surge at surface;
d. temperature increase or decrease; and
e. shifts in atmospheric stability.

Because of continuity of the atmosphere and motion of weather systems, the above features, which can be observed, will propagate along with the systems. Therefore, upwind observations of the atmosphere give valuable information about the occurrence and strength of a wind ramp event. This information, in turn, then is used in short-term prediction of WPREs. The denser the observation network, the better the information about the ramp events, and the better the prediction of the events.

The AON is one of the data sources for the analyzer because AON data:

a. are measured by standardized instruments/sensors;
b. are frequently available—high temporal resolution;
c. are densely distributed in space—high spatial resolution;
d. have proven data quality control schemes/processes;
e. are reliable compared to other kind of measurements; and
f. are easy to process for real time applications.

Based mainly on AON data, the SOA calculates spatial gradients and temporal trends of:

a. winds;
b. pressure;
c. temperature; and
d. humidity.

Results from calculation on the data (in some alternatives, primarily up-wind observation data) provide information about the existence and movement of synoptic scale and mesoscale weather systems that may cause wind and wind power ramps.

Once a ramping signal is detected, propagation of the signal (X) can be calculated (in a Cartesian coordinate) by:

$$\vec{v} \cdot \nabla X = u\frac{\partial X}{\partial x} + v\frac{\partial X}{\partial y} + w\frac{\partial X}{\partial z} \quad (5)$$

This equation provides information to identify a WPRE and detect its movement.

In one alternative, meteorological observations from surface stations (AON stations and local climatological observation stations) affect nowcasting algorithms/models in that:

(1) significant increase/decrease in wind speed at surface stations accompany surge/drop of forecast and observed power output, with a lead time.

(2) The lead time varies, depending on distance between the indicating station(s) and the wind farm, wind direction, and average wind speed.

(3) Variables measured at the 10 m level, like wind speed and pressure gradient, are the most significant predictors.

(4) Meteorological variables observed at multiple levels at AON 9 (see below) are important predictors; these variables include vertical gradients of temperature, wind shear, and Richardson number.

2.2 AON Site Locations

Figure 8:
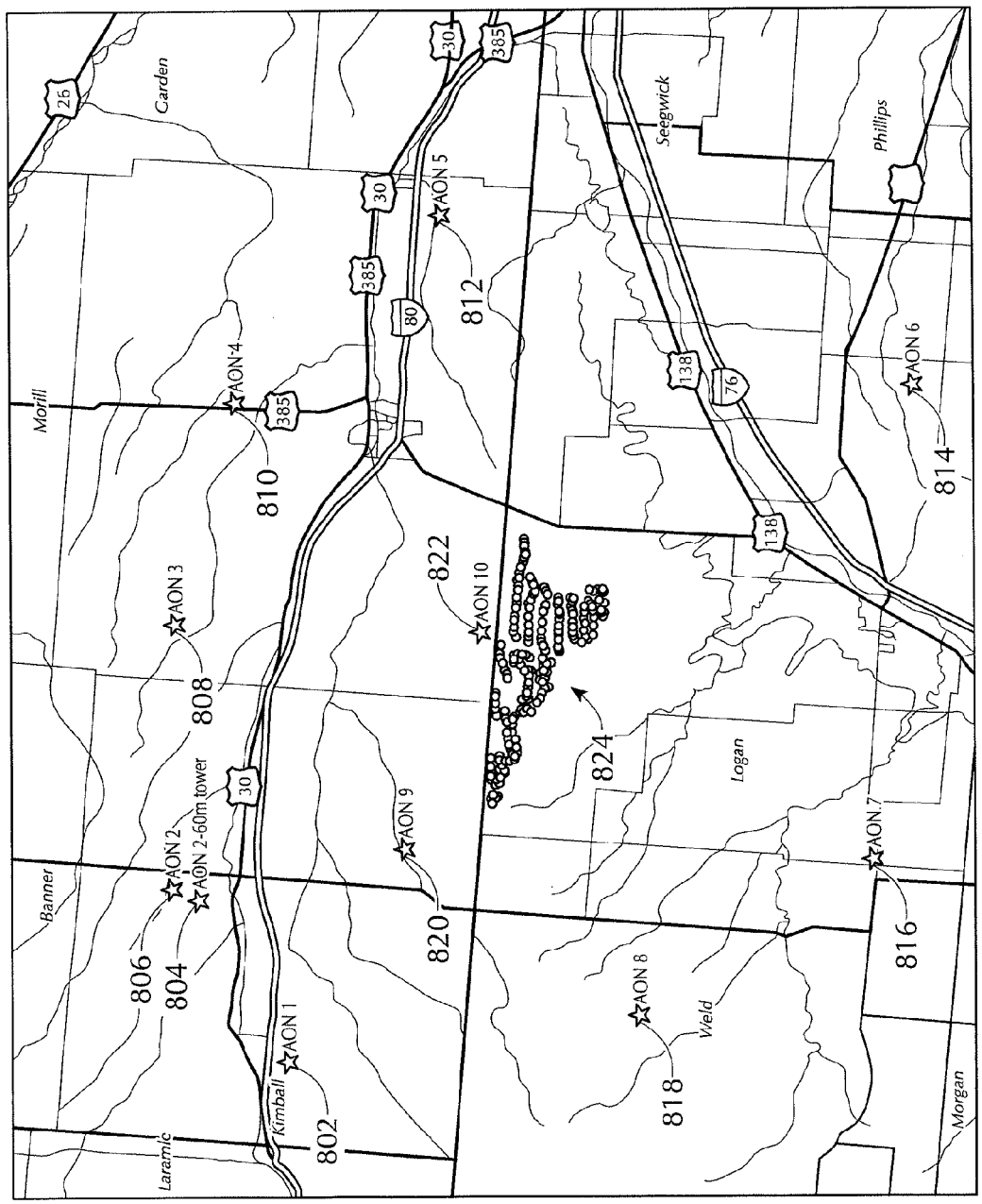
FIG. 8 shows locations of Atmospheric Observation Network (AON) sites in an exemplary system.

The locations of AON sites in an exemplary system is recorded in Table 2 and shown in FIG. 8. In this real world example, the wind farm 824 is the area of interest. A ceilometer is not included in the table or on FIG. 8, but is in operation in this example.

TABLE 2

| Site | Tower | Lat (decimal degrees) | Lon (decimal degrees) | Legal | County | State |
|---|---|---|---|---|---|---|
| AON 1 802 | 10 m | 41.169423 | −103.931288 | SE4S23T14NR58W | Kimball | NE |
| AON 2 804 | 60 m | 41.274166 | −103.701385 | NW4S13T15NR56W | Kimball | NE |
| AON 2 806 | Wind Profiler | 41.30195 | −103.688033 | NE4S1T15NR56W | Kimball | NE |
| AON 3 808 | 10 m | 41.32095 | −103.298233 | NW4S33T16NR52W | Cheyenne | NE |
| AON 4 810 | 10 m | 41.279311 | −102.963733 | NE4S17T15NR49W | Cheyenne | NE |
| AON 5 812 | 10 m | 41.09091 | −102.66823 | NE4S23T13NR47W | Cheyenne | NE |
| AON 6 814 | 10 m | 40.614366 | −102.87415 | SW4S32T8NR49W | Logan | CO |
| AON 7 816 | 10 m | 40.6142 | −103.569683 | SE4S31T8NR55W | Logan | CO |
| AON 8 818 | 10 m | 40.830183 | −103.825916 | NE4S23T10NR58W | Weld | CO |
| AON 9 820 | 60 m | 41.075416 | −103.60405 | NW4S26T13NR55W | Kimball | NE |
| AON 10 822 | 10 m | 41.018988 | −103.337682 | SW4S11T12NR53W | Cheyenne | NE |

AON 2 804 is a special site in that the LAP-3000 wind profiler is installed at a somewhat separated location from the AON 2 806. This is due to the need to separate the profiler from the 60 meter tower.

2.2 AON Tower Instrumentation 60 meter Towers:
60 meter height: Wind speed and direction, Temperature, and Humidity Measurements.
30 meter height: Wind speed and direction, Temperature, and Humidity Measurements.
10 meter height: Wind speed and direction Measurement.
2 meter height: Temperature and Humidity Measurements.
Pressure measurement instrument is in MAWS 301 cabinet.

10 Meter Masts:
10 meter height: Wind speed and direction Measurement.
2 meter height: Temperature and Humidity Measurements.
Pressure measurement instrument is located in MAWS 110 cabinet.

2.3 Vertical Atmospheric Analyzer (VAA)

Strong wind shear is often associated with severe synoptic scale and mesoscale weather systems. Measurements of wind shear thus provide important information about the possibility of WPREs. One example of a VAA is the Vaisala LAP-3000. The Vaisala LAP-3000 Lower Atmosphere Wind Profiler is a Doppler radar which provides vertical profiles of horizontal wind speed and direction, and vertical wind velocity up to an altitude of 3 km above ground level. It can also measure turbulence, boundary and mixing layer heights, and combined with other data, atmospheric instability.

High vertical and temporal resolution data from the wind is used to identify severe weather systems and estimate their evolution (e.g., passage of a frontal system, its movement, and its strength). Aided by surface wind measurements at AON, the wind profiler data is used to interpolate wind profile to hub height at which wind speed is critical for power generation.

Treating consecutive wind profiler measurements as a time series, wind profiles extrapolate down the wind stream to a wind farm and into the future.

Figure 10:
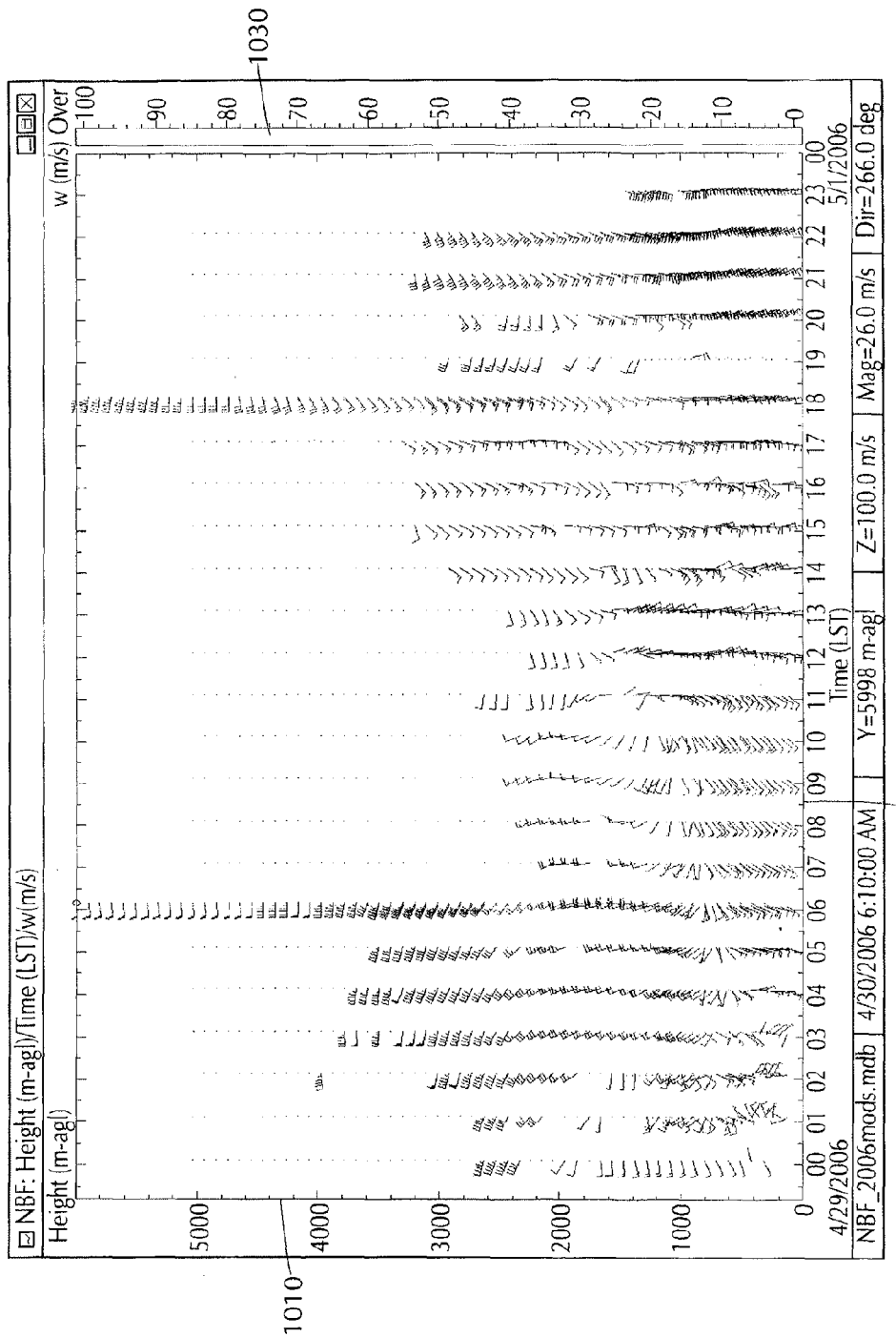
FIG. 10 shows an example of the output from a Vertical Atmospheric Analyzer (VAA)

FIG. 10 shows an example of the output from a Vertical Atmospheric Analyzer. The Y-axis 1010 measures the height of the wind in feet, and the X-axis 1020 measures the time. The intensity of the wind is indicated by varying color, but is not shown in this figure.

In one example, a LAP 3000 wind profiler is installed NW of Logan-Peetz wind farm at AON 9 820, shown in FIG. 8. The AON09 wind speed and the wind profiler<200 m averaged winds have a correlation coefficient of ~0.84, with wind profiler leading on the average by 6 minutes.

2.4 Mesoscale Numerical Model (MNM)

Performance of a mesoscale model largely depends on initial and boundary conditions applied to the model. With data from specifically designed AON, mast towers, wind profiler and other sources, quantity and quality of initial and boundary conditions improves significantly. This improvement enhances accuracy of the model forecasts and subsequently leads to usefulness of numerical model forecasts within a 3- or 4-hour horizon.

A fast four-dimensional data assimilation scheme is used to take advantage of the sensor network. Once an early signal of a (possible) ramp event is detected by SOA and VAA, the numerical model is run to catch the signal and simulate the evolution of the event. Results from the model run are used to aid the Neural Network Pattern Recognizer and is integrated, together with the Statistical Forecast Model, into the final step of the WPRE prediction.

Besides fast and effective data assimilation (very likely to be a data nudging) scheme, the mesoscale model is "light" and fast in response. This requires good balance on the needs of a fine spatial resolution and a fast execution time. In an alternative, a daily or half-daily scan on mesoscale model outputs may still be able to give us clues about severe weather systems and an early alert.

2.5 Neural Network Pattern Recognizer (NNPR)

The NNPR has to be trained, by feeding it teaching patterns and letting it change its weights according to some learning rule, before being put into real-time application. The variables as inputs to the NNPR are mainly up-wind meteorological variables like wind speed, wind direction, pressure, temperature, and humidity.

Instead of training the neural network indiscriminately based on all of the historical data, the NNPR uses carefully selected data sets which involve WPREs only. Doing so increases the effectiveness of the NNPR and, at the same time, reduces the burden on computational resources.

2.6 Statistical Forecast Model (SFM)

Statistical forecasting models can be categorized into two models:
  a. Time series models (e.g., AR model), in which the independent variable is time; and
  b. Explanatory models (e.g., multivariate regression), in which the variable is one or more factors.

Time series models assume that whatever forces have influenced the variable(s) in question (such as wind power output) in the recent past will continue into the near future. They are very useful for short-term forecasting problems. The proposed SFM is an AR model, although a multivariate regression model is not ruled out completely.

The total actual power output from a wind farm is taken as a time series, upon which statistical model(s) simulate. Doing so bypasses the problem connected to the uncertainty of the power curve as shown in FIG. 5. However, accurate prediction of wind speed helps to adjust and improve direct forecasts on power output.

Certain types of weather systems may take a certain route to pass a wind farm. Nonhomogenous terrain has different influences on wind fields and thus power output. Taking these into account, the AR model is developed in predefined eight wind direction sectors, each with 360/8=45 degrees. Wind-direction-dependent statistical models are expected to perform better than a single general model.

2.7 Alternatives 2.7.1 Radar Data

In one alternative to the method of FIG. 9, radar data is included as part of the analysis. Weather radar is used to detect weather systems and observe precipitation instantaneously. Modern digital radar systems and data processors now have capabilities far beyond early applications and are able to track storms fairly robustly and accurately. This provides users of the system with the ability to acquire detailed information of each storm, such as location and movement. Naturally enough, radar and its data can be thought of as a helpful tool that enhances the WPRE nowcasting system. Precipitation events detectable by radar are tied to wind events and durations based on the characteristics of the precipitation event. Such radar data may also be used in relation to the embodiments shown in FIGS. 1, 2, and 16a-e.

2.7.2 Lagrangian Scalar Integration (LSI)

In one alternative, LSI is used to enhance detection of synoptic and mesoscale features. LSI is a technique that is applied to the gridded surface wind and scalar analyses. A grid of tracers is specified over wind analysis at a resolution consistent with features of interest (synoptic or mesoscale) and is advected following the horizontal winds. Data are gathered along each trajectory as a time series which is then time-averaged over some fixed integration period. Specified features are then extrapolated in line with advection. This technique is akin to releasing "numerical weather balloons" and taking measurements along their paths. Such a LSI may also be used in relation to the embodiments shown in FIGS. 1, 2, and 16a-e.

2.8. Summary

Among various models/methods, AR models and ANN methods stand out for their power of dealing with time series and recognizing patterns respectively.

Wind-power-ramp-related weather systems are associated with strong wind shear within or above a boundary layer, shifts of atmospheric stability, and more importantly, leave "footprints" on the surface that can be observed. The surface may be the surface of a weather system, a boundary layer, or other metrological formation. In this disclosure, the phrase "wind farm" is a targeted applicant of the nowcasting system. Once the concept, the logic, the methods, and the system are proven, they can be applied to the prediction of wind energy portfolios. In general, forecasts for portfolios of wind farms are significantly more accurate than forecasts for an individual wind farm, especially for large ramp events.

3. Interface and Software Management System 3.1 User Interface

Figure 11:
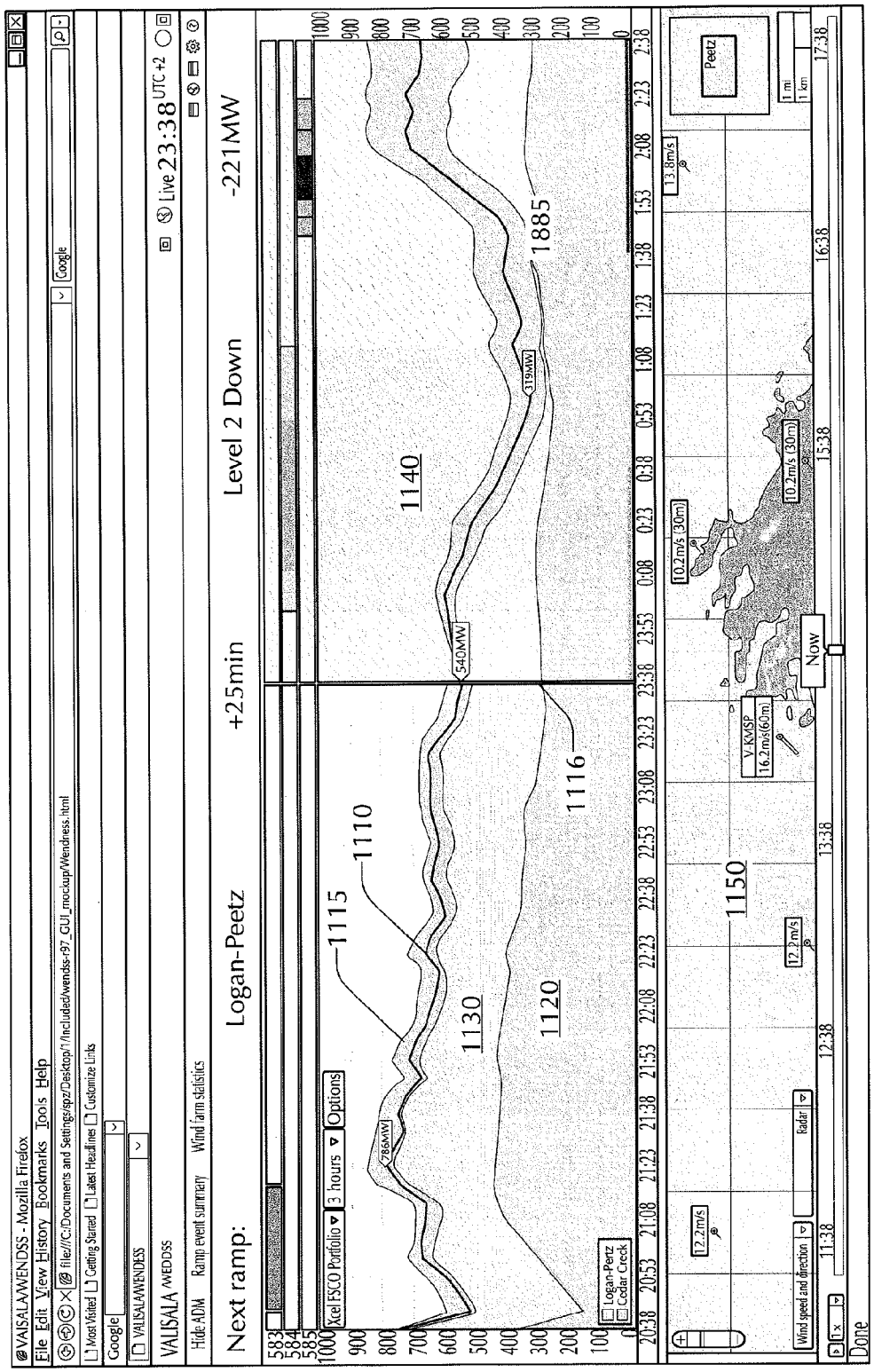
FIG. 11 shows an embodiment of an interface accessed by the user in a WPRE prediction system.

In one embodiment, the systems and methods for wind forecasting and/or WPRE prediction are implemented via a software interface provided to the user of the forecasting. FIG. 11 shows an example of the interface accessed by the user in a WPRE prediction system. Here, the interface is a browser based system, which does not require the user to install special software or hardware. From this view of the interface, the user can see the projected and historical wind power line 1110 and deviation band 1115, which shows the expected range of wind power. On the left side of now line 1116, historical data is shown; and on the right side of now line 1116, predicted wind power data is shown. In this case, the wind power monitored by the user is provided by two wind farms. The power produced by the first wind farm is the area 1120, and the power produced by the second is area 1130. These are automatically totaled by the system. The user may also access the map of the wind farms and view weather details overlaid on the map in area 1150. In one alternative, this map is implemented in GIS, graphical information system. Area 1140 denotes a WPRE, in this case a ramp down predicted by the system.

Referring to FIG. 12, a ramp event summary table is shown which is accessible to the user through the interface. The ramp event summary tale provides important details to the user concerning upcoming ramp events. The table identifies the wind farm 1210, the time until start 1220, the type of ramp 1230, the magnitude of the ramp 1240 in MW, the start time of the WPRE 1250, the end time 1260, and the duration 1270. In one alternative, this information may automatically be exported to a power grid management program to provide the user indications of what power resources such as gas and coal systems should be ramped up or down, or turned off or on.

FIG. 13 shows a window accessible through the interface by the user. The user may set ranges for the magnitude of ramp events and the rate of change for ramp events. For instance, in text entry area 1310, the user may set a low point for the magnitude of increase considered for a Level 1 ramp event. In text entry area 1320, the user may set a high point for the magnitude of increase considered for a Level 1 ramp event. In text entry area 1330, the user may set a low point for the rate of change considered for a Level 1 ramp event. In text entry area 1340, the user may set a high point for the rate of change considered for a Level 1 ramp event. In alternatives, indicator colors are set, as well as other alarms, such as audio alarms, email notifications, etc.

Figure 14:
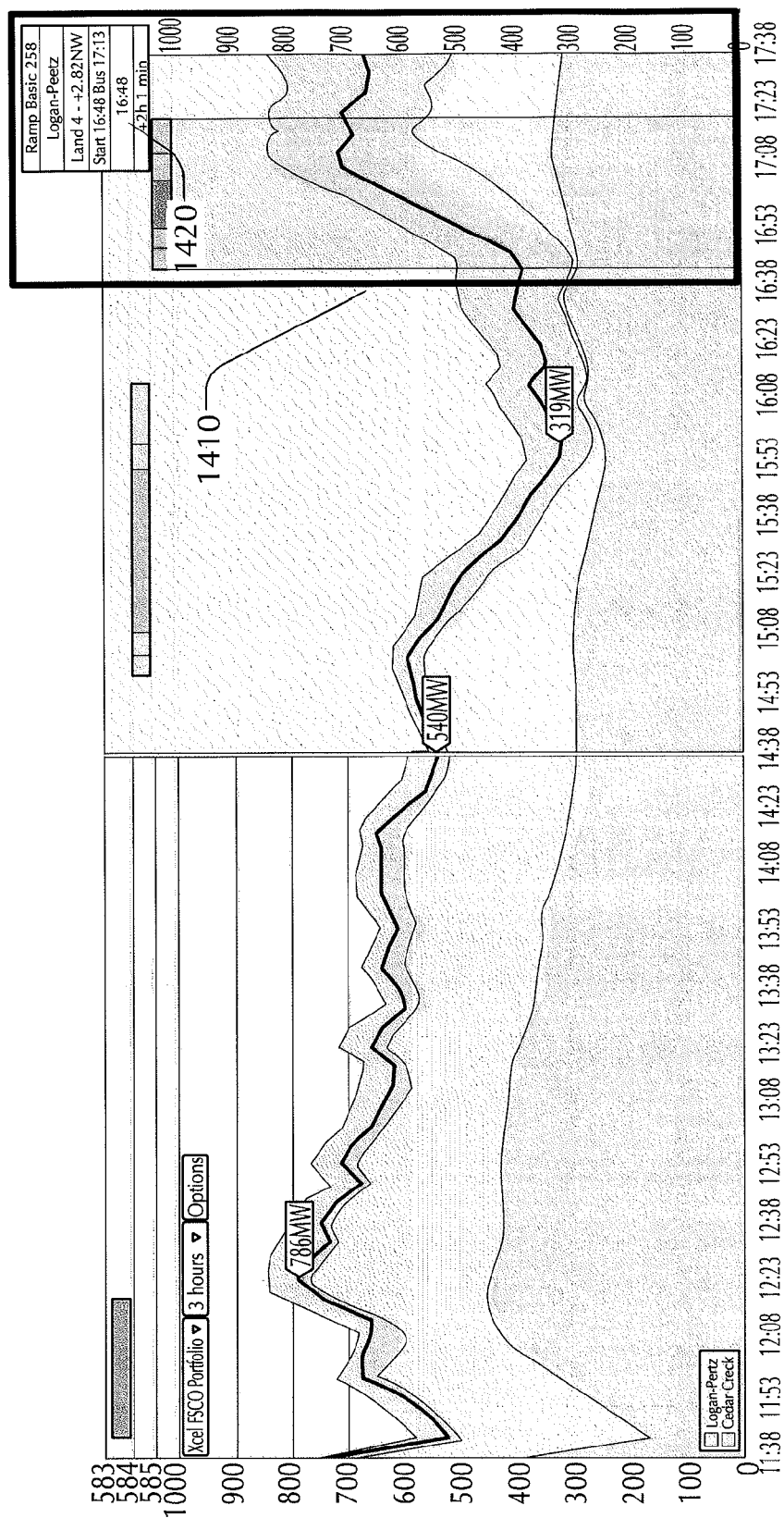
FIG. 14 shows one feature of the ramp window of FIG. 11.
Figure 15:
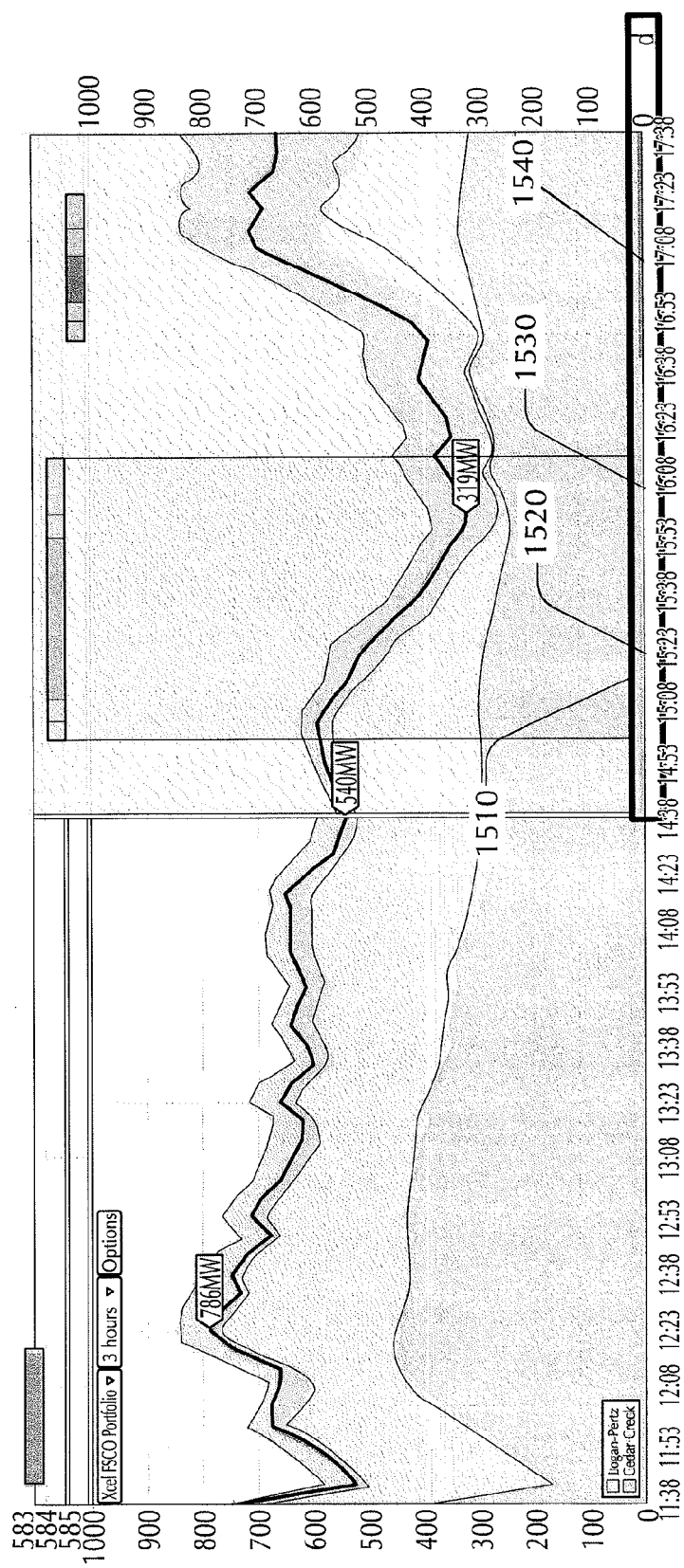
FIG. 15 shows another feature of the ramp window of FIG. 11.

Some exemplary ramp event classification has been reset to default values listed below:
  L1 (Level 1) Magnitude: 25-100 MW
  L2 Magnitude: 100-200 MW
  L3 Magnitude: 200-300 MW
  L4 Magnitude: >300 MW
  Rate of Change (ROC): 0-5 MW/min, Color: Green
  ROC: 5-8 MW/min, Color: Yellow
  ROC: 8-10 MW/min, Color: Orange
  ROC: >10 MW/min, Color: Red
  Rate of change in MW/Minute FIG. 14 shows one feature of the ramp window of FIG. 11. When a user hovers over a ramp event 1410 with the mouse cursor, details concerning the ramp event are displayed in popup 1420 including, but not limited to, the wind farms, the level of ramp event, the start and end times, and the duration. FIG. 15 shows another feature of the ramp window of FIG. 11. The area on the window 1510 denotes three distinct time periods for predictions, from t=0 to t=60 time period 1520, from t=60 to t=120 time period 1530, and from t=120 to t=180 time period 1540. The general volatility of these time periods is displayed to the user by color coding time periods 1520, 1530, 1540, wherein red indicates high volatility, yellow medium, and orange low.

Figure 18:
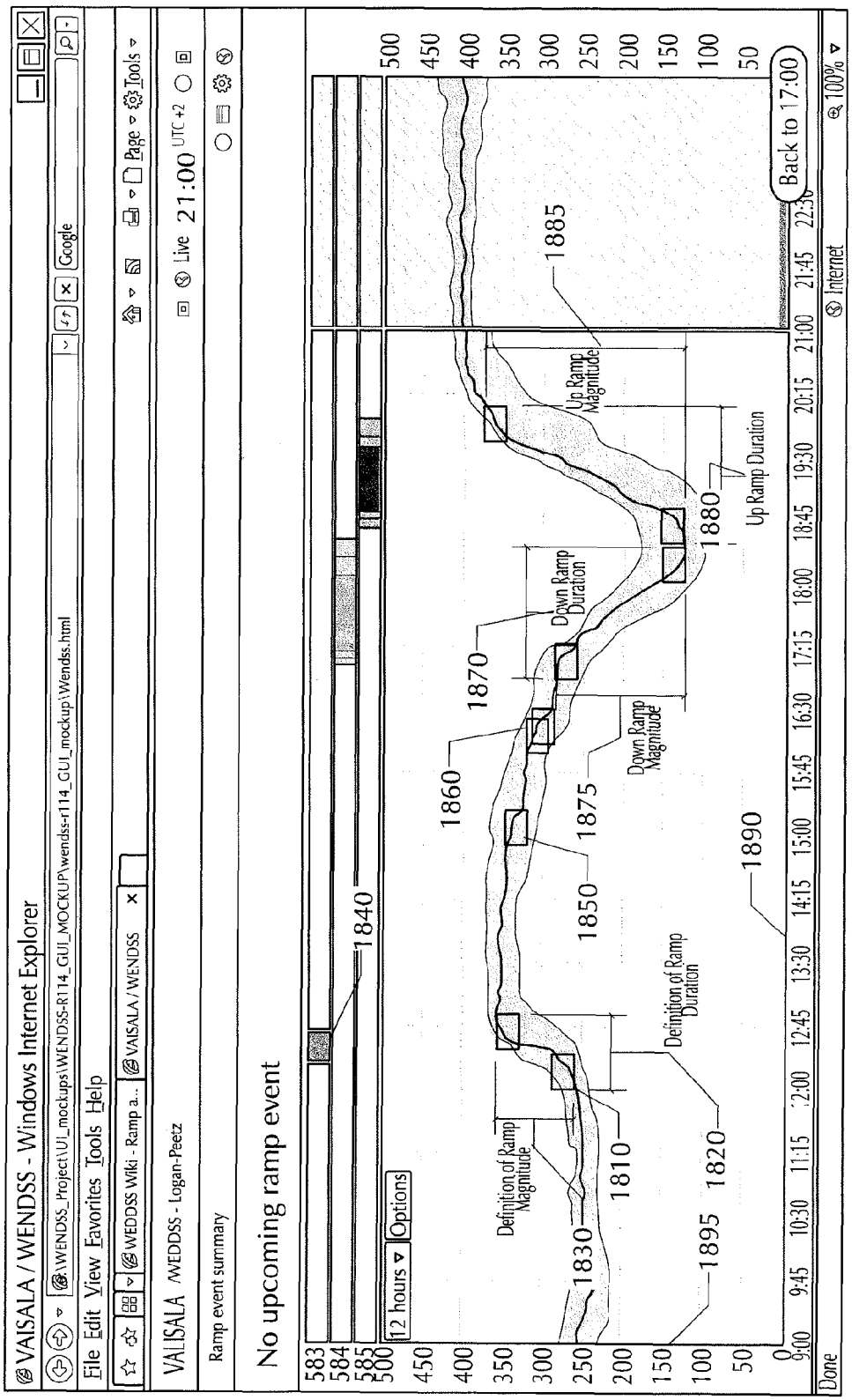
FIG. 18 shows an embodiment of a ramp window.

FIG. 18 shows one embodiment of a ramp window and features of a ramp window. The ramp window includes the sliding window 1810 concept with a wind of a fixed size based on a ratio of fixed change in power over fixed change in time. In short, this means that each category of ramp event is defined as described above in relation to ROC. Here the change in power 1830 divided by the change in time 1820 yields an orange ROC event 1840. Note how even though the duration of the ramp event, time 1820 is small, it still is a ramp event based on the rate of change and its qualification as a sufficient change in power 1830 to qualify as a level of ramp event. In event 1850, even though the rate of change is fast, the duration of the event and the size of the change of power are insufficient to qualify as a ramp event. Event 1860 is a false ramp event since duration and magnitude are not sufficient. Even though a ramp entry and exit are discovered, insufficient magnitude and duration exist to qualify as a ramp event. Another down ramp with a magnitude 1875 and duration 1870 and another up ramp with a magnitude 1885 and duration 1880 are also shown. The down ramp qualifies as an orange event based on its ROC and the up ramp as a red event based on its rate of change. The scale on y axis 1895 is MW and x axis 1890 is 45 minute intervals.

3.1 Architecture

Figure 17:
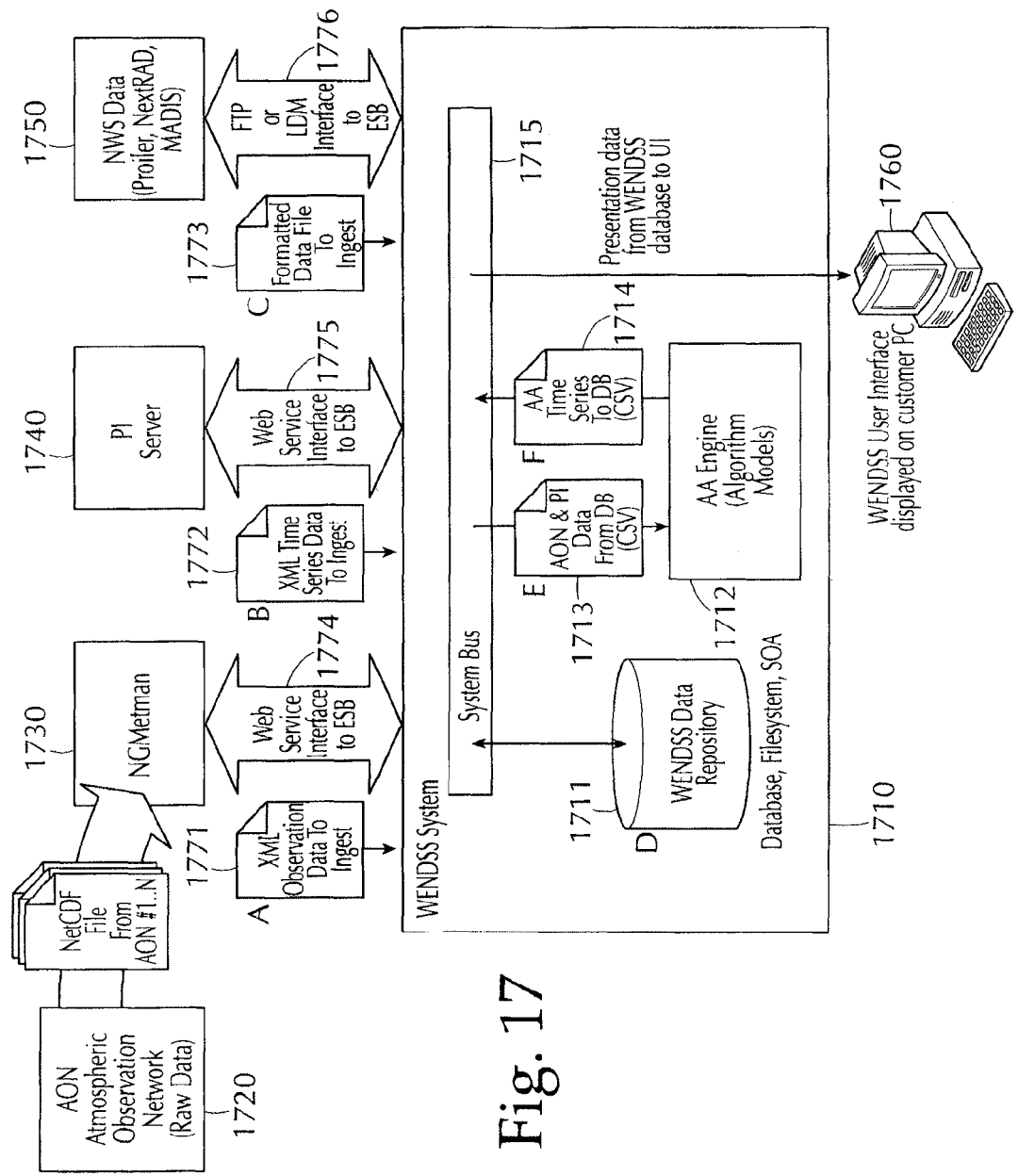
FIG. 17 shows an exemplary architecture for one embodiment of a system for detecting wind events.

An example of the architecture for one embodiment of a system for nowcasting wind events is shown in FIG. 17. The embodiments shown in other figures such as 1, 2, 9, and 16a-e may be implemented using similar architectures. The architecture includes a WENDSS system 1710. The WENDSS system is a single server that contains a database 1711, services (SOA, messaging, UI layer, Bus 1715, etc.), an AA forecast algorithm layer 1712, and interfaces to external systems and databases. The WENDSS internal database stores all system data including AON observations, historic PI data, and time-series forecasts 1714 created by the AA Engine 1712. AON and PI data 1713 are provided to the AA Engine 1712 for analysis. In alternatives, the WENDSS need not be a single server, and instead may be a distributed system, between two or more computers. The WENDSS may be a cloud computing system, or implemented in a variety of hardware and software configurations. XML observation data 1771, XML Time Series Data 1772, and Formatted Data files 1773 are all examples of data that are provide to WENDSS 1710.

The architecture includes an AON 1720. AON 1720 is a customized environmental data collection network that surrounds the wind farm. The network is made up of multiple AON stations. Most AON stations collect wind speed, wind direction, RH, and temperature data. In alternatives AON stations have wind profilers and/or ceilometers. An example of an AON is shown in FIG. 8 above.

NGMetman 1730 is a shared environmental database. It is used to ingest the AON data. NGMetman output jobs, specific for the WENDSS system, allow data files to be delivered to the WENDSS system on a regular interval. The AON data is used by the AA engine 1712 to produce the power forecast. In one alternative, the NGMetman 1730 produces XML data for the WENDSS system 1710.

PI Server 1740 provides plant information from a power company. The PI system (Plant Information System) collects data related to a wind farm including individual turbine and aggregate power generation data. The server in diagram receives PI data from the main PI server operated by the power company, and then forwards this data to the WENDSS system on a regular interval.

NWS data 1750 represents National Weather Service public data sources that also are used by the AA. Communication is provided between the WENDSS 1710 and PI Server 1740 and WENDSS 1710 and NGMetman 1720 via Web Service Interface to ESB 1774 and 1775. Communication is provided between the WENDSS 1710 and NWS data 1750 via FTP or LDM Interface to ESB 1776.

WENDSS User Interface 1760 is web-based user interface that presents system data to the user. Users access the UI using their existing network and associated PCs. Some details of one possible UI are described above. Numerous alternatives to the architecture described herein will occur to those skilled in the art in light of the disclosure of this architecture and the disclosure of systems and methods herein.

4. Examples

Some examples of how the systems and method described herein can be used are as follows.

The Customer Problem

Tom is an Operations Analyst in Xcel Energy's Real-Time Commercial Operations group that is responsible for dispatching and committing generation to meet their customers' energy needs while maintaining reliability on their service territory grid. His duties are focused upon Xcel Energy's Public Services of Colorado (PSCo) service territory that serves 1.35 million customers with an average load (electricity usage) ranging from 3,000 to 6,000 MW. Tom's job has become much more difficult in the past year as Xcel Energy continues to establish power purchase contracts with wind farms to meet the State of Colorado's Renewable Portfolio Standard that mandates 15% of their power delivered by 2015 must come from renewable sources. PSCo now integrates up to 1,258 MW of wind energy into their grid, which means under ideal wind conditions, up to 35% of PSCo's electricity delivered is coming from wind farms. Tom is supportive of Xcel Energy's adoption of wind energy, but there are a number of problems it creates for his day-to-day duties.

Xcel Energy's contracts mandate that they must pay each wind farm owner/operator for the power they produce and feed into PSCo's grid. Each wind turbine is rated upon a power curve that shows how much power is to be generated given the wind speed. Most modern wind turbines begin to generate power once winds exceed 4 ms-1 and quickly increase the amount of power generated to the full rated capacity of the turbine when winds exceed 12 ms-1. Wind speed fluctuations in this 4-to-12 ms-1 range cause rapid changes in energy production that Tom and his colleagues have never experienced with the coal and combined cycle gas plants they are accustomed to. They refer to these rapid changes in wind energy generation as "ramp events", due to the sharp curve typically seen in their total generation portfolio output. Ramp events make Tom's job difficult because he must keep PSCo's generation within their Area Control Error (ACE) of +/−56 MW more than 90% of the time (as measured in 10 min windows each month), which is mandated by the North American Electric Reliability Corporation (NERC) to ensure the transmission grid continues to operate properly. ACE is the instantaneous difference between net actual and scheduled interchange, taking into account the effects of frequency bias including a correction for meter error between PSCo and its neighboring NERC Balancing Areas. Additionally, PSCo's energy planning and trading groups cannot provide Tom with the best mix of generators to optimize their financial performance when the wind energy forecasts are not reliable. Tom realizes that the problems are only going to get worse as Xcel Energy continues to add more wind energy to its system.

Use Case #1 Overnight Ramp-Up Event (Operations Analyst Perspective)

Tom is an Operations Analyst in Xcel Energy's PSCo Real-Time Commercial Operations group on 24 Oct. 2008 working the late night shift at 2:00 am. The load forecast provided by Xcel Energy's meteorologist is typical of this time of year, as load will drop off into the early morning hours as people are sleeping and the temperatures cool. However, in his routine check the Vaisala WENDSS is forecasting a "Yellow Level 3 Advisory" Ramp-Up event to initiate between 3:40 and 4:00 am. WENDSS is an exemplary embodiment of systems and methods described herein. Wind energy generation is currently near 300 MW, so Tom realizes the ramp event will bring the contribution from wind to near its full rated capacity. Although the ramp rate will not be at a dangerous level, the timing of this ramp event greatly concerns Tom because it will coincide with the lowest loads of the day near 3,100 MW. Xcel Energy PSCo can only ramp down their coal generators to an aggregate 2,500 MW system minimum overnight to ensure reliable next day operation. Given the Vaisala WENDSS advisory, Tom recognizes that their total generation (base load+wind) will exceed the PSCo Balancing Area load. Tom immediately contacts the trading desk to initiate their planning efforts to offload generation to neighboring utilities. The trading desk is able to offload some energy starting at 4:00 am after the ramp initiates, but Tom has no other choice but to contact the Logan-Peetz Wind Farm at 4:15 am and ask them to open the breaker to their grid interconnection. Tom continues to track the Vaisala WENDSS short-term wind generation forecast and is able to bring Logan-Peetz back on the grid at 6:10 am as PSCo Balancing Area load increases to levels sufficient to support minimum base load and the full capacity wind generation as people wake-up and turn their lights on. The Vaisala WENDSS' accurate forecast of the timing and magnitude of the ramp event allowed Xcel Energy to stay within their ACE 80% of the time and handle the early morning ramp event in the most cost effective manner.

Use Case #2 Late Afternoon Ramp-Up Event (Operations Analyst Perspective)

Tom is working the daytime shift as an Operations Analyst in Xcel Energy's PSCo Real-Time Commercial Operations group on 11 Aug. 2008. It is a hot summer afternoon in Colorado and customer load continues to rise to near 5,800 MW as energy consumption rates near their peak for the day. Xcel Energy's meteorologist advised Tom's team earlier in the morning that the temperatures would be very hot in the upper 80's and the winds would be light, with a chance for isolated thunderstorms. To meet this anticipated demand, Xcel Energy scheduled to bring two combined cycle gas plants online in the late afternoon since there would be little available wind energy.

At 2:00 pm, Tom felt he had everything under control and he continued to monitor his Energy Management System display that tracks the base load generators and the Automated Generation Control (AGC) that slowly increases generation from their coal and combined cycle gas plants to meet the PSCo Balancing Area load and maintain their ACE compliance. As expected, wind energy generation had been less than 100 MW for most of the day, but a flashing alert on the Vaisala Wind Energy Decision Support System (WENDSS) caught his eye. Tom acknowledged the alert and saw a Red Level had been issued to occur between 3:05 and 3:15 pm due to strong outflow winds from thunderstorms in rural northeast Colorado, where most of their wind farms are clustered. If the event was as strong as forecasted, more than 20 MW of wind energy would be coming online every minute, making it difficult to stay in ACE compliance. Tom immediately began following the safety procedure developed by his manager. He calls the their largest combined cycle gas plant to initiate the 10 minute process necessary to obtain manual control of their system. Tom could rely upon using their "go-to-minimum" command they can transmit to each of their plants, but this only allows for a 3 MW min-1 ramp down for each plant and would not be sufficient to balance the grid due to the extreme wind event. At 3:10 pm, Tom monitors the Vaisala WENDSS and sees the wind energy generation begin to ramp up from 80 MW to 250 MW within 20 minutes on the real-time display. He is able to manually instruct the combined cycle gas plant operator to cycle down from 700 MW to 400 MW to keep the ACE within its boundaries thanks to his advanced planning. The Vaisala WENDSS 3-hour forecast shows the ramp will continue for another hour, but after the thunderstorms pass the load will begin to drop as the wind power generation drops, so Tom will be able to relinquish control of the combined cycle gas plant back to the operators and pass along a normal workload to the next shift. Thanks to the Vaisala WENDSS, Tom saved Xcel Energy up to $50,000 it would have been obligated to pay their wind farms if generation had been curtailed.

Use Case #3 Late Afternoon Ramp-Up Event (Trader Perspective)

Karl is working the same shift as Tom, as a Trader in Xcel Energy's PSCo Real-Time Commercial Operations group on 11 Aug. 2008. It is his responsibility to optimize Xcel Energy's financial performance by selling energy at the highest price when generation exceeds load, and purchase energy at the lowest price when load exceeds generation. Xcel Energy was not expecting much wind contribution to their generation mix, so their three largest coal generation plants and combined cycle gas unit were scheduled for significant operation during the PSCo Balancing Area peak load in the late afternoon. However, the isolated thunderstorm activity in the vicinity of Xcel Energy's wind farms introduced unexpected levels of wind energy generation that created an ACE of +75 MW at 5:55 pm just after the wind ramp event initiated. Karl had consulted the WENDSS as part of his standard procedures 15 minutes ago so he was prepared to assist Tom by offloading some of their combined cycle gas generation to a neighboring Balancing Area that was struggling to cope with the warm temperatures and peak load conditions. Karl was able to sell electricity at a significant price premium due to Xcel Energy's advantage of having wind energy on their system. The Vaisala WENDSS' accurate prediction of the ramp event with at least 30 minutes lead time led to improved reliability and financial gain under difficult conditions.

Use Case #4 Late Afternoon Ramp-Down Event (Operations Analyst Perspective)

Tom is an Operations Analyst in Xcel Energy's PSCo Real-Time Commercial Operations group on 15 Jun. 2009 at 3:30 pm. During his routine checks, he notices a flashing red notification on the Vaisala WENDSS notifying him of an "Orange Level 4 Alert" Ramp-Down to initiate between 5:00 and 5:20 pm. Tom has come to recognize that it is difficult to pinpoint the timing of ramp events, but the uncertainty timing window provided by the Vaisala WENDSS allows him to initiate the necessary actions in response to the suspected event. The day-ahead generation schedule issued by Xcel Energy limited the amount of base load on-line, as wind energy was expected to be a significant contributor through the day. Tom continued to closely watch the WENDSS and checked it every five minutes as the forecast was updated using the latest information from the atmospheric observation networks surrounding the wind farms. He appreciates the forecast probability information in the WENDSS graphical display. The confidence bands around the forecast allow Tom to run various simulations in his GenTrader application running on another display that provides decision support regarding the most economical generators to use when reserves must be brought online.

In a situation where the PSCo Balancing Area's ACE drops quickly and approaches the negative −56 MW, Tom's best available option is to dispatch the appropriate number of natural gas peaker units with at least 10 minutes lead time and have them prepared as spinning reserves before the wind ramp-down initiates. At 4:55 pm the Vaisala WENDSS forecasts the ramp down will be moderate, with a peak rate of change of −16 MW min-1 with an expected duration of 70 minutes. The Vaisala WENDSS is having a difficult time resolving the magnitude of the event, as it could range from −250 to −425 MW according to the confidence bands. Based on this information, Tom dispatches 8 natural gas peaker units and advises the trading group to move forward with purchasing electricity on the open market as a necessary precaution. The short duration of the ramp will eliminate the need to dispatch operating reserves, as the current base load generators can be cycled up to appropriate levels while the ramp event is ongoing.

At 5:20 pm the ramp-down event initiates and Tom commits the spinning reserves in an efficient manner maintaining the ACE at a comfortable −30 MW level. Tom continues monitoring the WENDSS at 5:40 pm as wind generation has dropped 180 MW to an aggregate of 200 MW across PSCo. Thankfully the peak ramp rate has only reached −11 MW min-1, but Tom is cautious since the wind generation volatility index is at a Red level, indicating a majority of the wind turbines are operating at wind speeds between 4-to-12 ms-1 and could change power output very quickly. The WENDSS indicates that the ramp rate should level out at 6:30 pm, so Tom issues requests to de-commit the natural gas peakers one-by-one as the base load generators have been cycled up to levels to support the diminishing load as it drops below 4,000 MW into the nighttime hours.

In the post-event analysis, Tom's manager complimented him on his use of the Vaisala WENDSS during the event to support his decision-making process. The early notification of the potential ramp-down allowed Tom to stage the reserve units well in advance to ensure reliability of the grid. In fact, Tom was able to dispatch lower cost flex reserve units that need 20-40 minutes lead time thanks to the WENDSS. Tom's manager acknowledged that Xcel Energy had incurred $100,000 in expenses tied to dispatch and utilization of the reserve units, but it ensured they did not have to shed load and revenue by opening breakers to large industrial customers. Even more importantly, Xcel Energy maintained the trust and confidence from their customer base that they can keep the lights on under the most difficult of circumstances at competitive market prices.

In all cases of the above-described embodiments, the results of any of the transformations of data described may be realized by outputting the results by transforming any physical or electronic medium available into another state or thing. Such output includes, but is not limited to, producing hard-copy (paper), sounds, visual display (as in the case of monitors, projectors, etc.), tactile display, changes in electronic medium, etc. The foregoing description of the embodiments of the inventions has been presented only for the purpose of illustration and description and is not intended to be exhaustive or to limit the inventions to the precise forms disclosed. Numerous modifications and adaptations are apparent to those skilled in the art without departing from the spirit and scope of the inventions.

The invention claimed is:

1. A wind power ramp event nowcasting system comprising:
   a server including:
      a wind condition analyzer for detecting a wind power ramp signal;
      a physical numerical model, wherein the physical numerical model is a mesoscale numerical model;
      a neural network pattern recognizer; and
      a statistical forecast model, wherein the statistical forecast model receives input from the wind condition analyzer, the physical numerical model, and the neural network pattern recognizer; and the statistical forecast model outputs a time and duration for the wind power ramp event (WPRE) for the wind farm; and
   a sensor array situated in an area relative to a wind farm, the sensor array providing data to the wind condition analyzer.

2. The system of claim 1 wherein the wind condition analyzer includes:
   a surface observation analyzer; and
   a vertical atmospheric analyzer.

3. The system of claim 2 wherein the surface observation analyzer detects a significant change in wind speed, strong vertical and horizontal wind shears, a pressure drop or surge at the surface, a temperature increase or decrease, and shifts in atmospheric stability; the data is provided from an Atmospheric Observation Network (AON), which is part of the sensor array; and the surface observation analyzer includes a module for detecting and calculating winds, pressure, temperature, and humidity.

4. The system of claim 2 wherein the vertical atmospheric analyzer provides vertical profiles of horizontal wind speed and direction and boundary and mixing layer heights and atmospheric instability.

5. The system of claim 1 wherein the neural network pattern recognizer is trained by providing it teaching patterns.

6. The system of claim 5 wherein the neural network pattern recognizer changes according to a learning rule.

7. The system of claim 5 wherein the teaching patterns are upwind meteorological variables.

8. The system of claim 7 wherein the upwind meteorological variables are wind speed, wind direction, pressure, temperature, and humidity.

9. The system of claim 5 wherein the teaching patterns are data sets which involve wind power ramp events (WPREs).

10. The system of claim 1, further comprising:
    a radar analyzer, which provides input to the statistical forecast model.

11. The system of claim 1, further comprising:
    a Lagrangian Scalar Integration analyzer, which provides input to the statistical forecast model.

12. A wind forecasting system comprising:
a server including:
- a wind condition analyzer for detecting a wind power ramp event signal;
- a mesoscale numerical model;
- a neural network pattern recognizer, wherein the neural network pattern recognizer is trained by providing it teaching patterns, and the neural network pattern recognizer changes according to a learning rule;
- a statistical forecast model, wherein the statistical forecast model receives input from the wind condition analyzer, the mesoscale numerical model, and the neural network pattern recognizer, and the statistical forecast model outputs a wind power ramp event for the area; and
- a sensor array situated in an area, the sensor array providing data to the wind condition analyzer.

13. The system of claim 12, wherein the teaching patterns are upwind meteorological variables and the upwind meteorological variables are wind speed, wind direction, pressure, temperature, and humidity.

14. The system of claim 12, wherein the teaching patterns are data sets which involve prior occurrences of wind events similar to the wind event, and the prior occurrences of wind events are selected from the group consisting of events that caused a wind power ramp event (WPRE), tornadoes, thunderstorms, and storms with damaging winds.

15. A graphical user interface system for managing a wind farm, the system comprising a server configured to:
- detect a footprint of a wind event that will occur in the future for an area of interest with a first module;
- determine a duration and intensity of the wind event with a second module; and
- determine a predicted wind and wind power ramp event;
wherein the server further provides a:
(a) a wind power ramp event prediction window, showing the predicted wind and wind power ramp events;
(b) an Atmospheric Observation Network monitoring window, showing the Atmospheric Observation Network and the wind farm;
(c) a ramp event message window showing ramp event alerts;
(d) a ramp event classification screen, providing for classification of ramp events; and
(e) a history window, providing a history of past events and wind generation statistics.

16. A method of providing a wind event forecast, the method comprising:
(a) detecting a footprint of a wind event that will occur in the future for an area of interest with a first module;
(b) determining a duration and intensity of the wind event with a second module; and
(c) providing the wind event forecast.

17. The method of claim 16, further comprising:
(d) providing sensor data from a sensor array to the first module that is upwind of the area of interest, wherein the sensor data is used to detect the footprint;
(e) providing the sensor data from the sensor array to the second module, wherein the sensor data is used in the determining of (d), wherein the first module includes a surface observation analyzer and a vertical atmospheric analyzer and the first module detects fronts as part of detecting the footprint, the fronts are marked by changes in temperature, moisture, wind speed and direction, atmospheric pressure, and a change in the precipitation pattern;
the first module detects mesoscale features as part of detecting the footprint, wherein the mesoscale features are marked by an increase in cumuliform clouds and rain showers; and
the first module detects dry lines, outflow boundaries/squall lines, lee troughs, and sea/lake breezes as part of detecting the footprint.

18. The method of claim 17, wherein the second module includes a neural network, a mesoscale numerical model, and a physical numerical model.

19. The method of claim 17, further comprising
(d) training the neural network by providing weather data, wherein the weather data is data sets which involve WPREs only.

* * * * *